United States Patent
Lei et al.

(10) Patent No.: US 12,426,126 B2
(45) Date of Patent: Sep. 23, 2025

(54) IDLE/INACTIVE MODE PROCEDURES FOR REDUCED CAPABILITY USER EQUIPMENT

(71) Applicant: QUALCOMM Incorporated, San Diego, CA (US)

(72) Inventors: Jing Lei, San Diego, CA (US); Peter Gaal, San Diego, CA (US); Masato Kitazoe, Tokyo (JP); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 560 days.

(21) Appl. No.: 17/676,097

(22) Filed: Feb. 18, 2022

(65) Prior Publication Data

US 2023/0269817 A1   Aug. 24, 2023

(51) Int. Cl.
*H04W 36/08* (2009.01)
*H04L 1/00* (2006.01)
(Continued)

(52) U.S. Cl.
CPC ....... *H04W 76/28* (2018.02); *H04W 36/0072* (2013.01); *H04W 36/08* (2013.01); *H04L 1/0025* (2013.01)

(58) Field of Classification Search
CPC .............. H04W 76/28; H04W 72/0453; H04L 5/0048; H04L 5/0053; H04L 5/003; H04L 5/001
See application file for complete search history.

(56) References Cited

U.S. PATENT DOCUMENTS

2019/0068348 A1   2/2019 Nam
2021/0029678 A1   1/2021 Liu et al.
(Continued)

FOREIGN PATENT DOCUMENTS

WO   2019097104 A1   5/2019
WO   2021190510 A1   9/2021

OTHER PUBLICATIONS

Interdigital Inc: "Control Channel Monitoring for Bandwidth Adaptation", 3GPP TSG RAN WG1 Meeting #89, R1-1709015, 3rd Generation Partnership Project, Mobile Competence Centre, 650, Route Des Lucioles, F-06921 Sophia-Antipolis Cedex, France, vol. RAN WG1, No. Hangzhou, China, May 15, 2017-May 19, 2017, May 14, 2017, XP051274177, pp. 1-3, Section 2.1.
(Continued)

*Primary Examiner* — Faruk Hamza
*Assistant Examiner* — Aixa A Guadalupe-Cruz
(74) *Attorney, Agent, or Firm* — Patterson & Sheridan LLP

(57) ABSTRACT

Certain aspects of the present disclosure provide techniques for wireless communication by a user equipment (UE), generally including receiving, from a network entity, a configuration for a first downlink (DL) bandwidth part (BWP), a first control resource set (CORESET) configured on the first DL BWP, and one or more first search space (SS) sets within the first CORESET, receiving, from the network entity, a configuration for a second downlink BWP, a second CORESET configured on the second DL BWP, and one or more second SS sets within the second CORESET, receiving signaling configuring the UE for physical downlink control channel (PDCCH) monitoring adaptation, and monitoring for PDCCHs, subject to the PDCCH monitoring adaptation, when performing one or more idle mode or inactive mode procedures on at least one of the first DL BWP or the second DL BWP.

19 Claims, 20 Drawing Sheets

(51) Int. Cl.
*H04W 36/00* (2009.01)
*H04W 76/28* (2018.01)

(56) References Cited

U.S. PATENT DOCUMENTS

| | | | | |
|---|---|---|---|---|
| 2022/0217636 | A1* | 7/2022 | Shrivastava | H04L 1/1812 |
| 2023/0209464 | A1* | 6/2023 | Tsai | H04L 5/0053 |
| | | | | 370/311 |
| 2023/0269639 | A1 | 8/2023 | Lei et al. | |
| 2023/0269726 | A1* | 8/2023 | Li | H04W 72/1273 |
| | | | | 370/329 |
| 2023/0269752 | A1* | 8/2023 | Li | H04L 5/0053 |
| | | | | 370/329 |
| 2023/0328652 | A1* | 10/2023 | Zhou | H04W 52/0235 |
| | | | | 370/318 |
| 2025/0056664 | A1 | 2/2025 | Lei et al. | |

OTHER PUBLICATIONS

International Search Report and Written Opinion—PCT/US2023/060853—ISA/EPO—May 8, 2023.
Mediatek Inc: "On Reduced Bandwidth Aspects of NR RedCap UEs", 3GPP TSG RAN WG1 Meeting #106bis-e, R1-2109573, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 2, 2021, XP052058518, 4 pages, p. 3.
Moderator (Ericsson): "FL Summary #5 on Reduced Maximum UE Bandwidth for RedCap", 3GPP TSG-RAN WG1 Meeting #106bis-e, R1-2110381, 3rd Generation Partnership Project, Mobile Competence Centre, 650, Route Des Lucioles, F-06921 Sophia-Antipolis Cedex, France, vol. RAN WG1, No. e-meeting, Oct. 11, 2021-Oct. 19, 2021, Oct. 19, 2021, XP052061577, 118 pages, p. 32-p. 34 p. 59-p. 60 p. 93.
Moderator (Ericsson): "FL Summary #7 on Reduced Maximum UE Bandwidth for RedCap", 3GPP TSG-RAN WG1 Meeting #106-e, R1-2108632, 3rd Generation Partnership Project, Mobile Competence Centre, 650, Route Des Lucioles, F-06921 Sophia-Antipolis Cedex, France, vol. RAN WG1, No. e-meeting, Aug. 16, 2021-Aug. 27, 2021, Aug. 28, 2021, XP052043050, 143 pages, p. 68.
Nordic Semiconductor ASA: "On Aspects Related to Reduced Maximum UE BW", 3GPP TSG RAN WG1 #107, R1-2112376, 3rd Generation Partnership Project, Mobile Competence Centre, 650, Route Des Lucioles, F-06921 Sophia-Antipolis Cedex, France, vol. RAN WG1, No. e-meeting, Nov. 11, 2021-Nov. 19, 2021, Nov. 5, 2021, XP052074441, 9 pages, p. 1-p. 3.
TCL Communication: "Consideration on REDCAP Devices Bandwidth Reduction", 3GPP TSG RAN WG1 Meeting #104-e, R1-2100310, 3rd Generation Partnership Project, Mobile Competence Centre, 650, Route Des Lucioles, F-06921 Sophia-Antipolis Cedex, France, vol. RAN WG1, No. Online, Jan. 25, 2021-Feb. 5, 2021, Jan. 19, 2021, XP051970913, 3 Pages, p. 2.

* cited by examiner

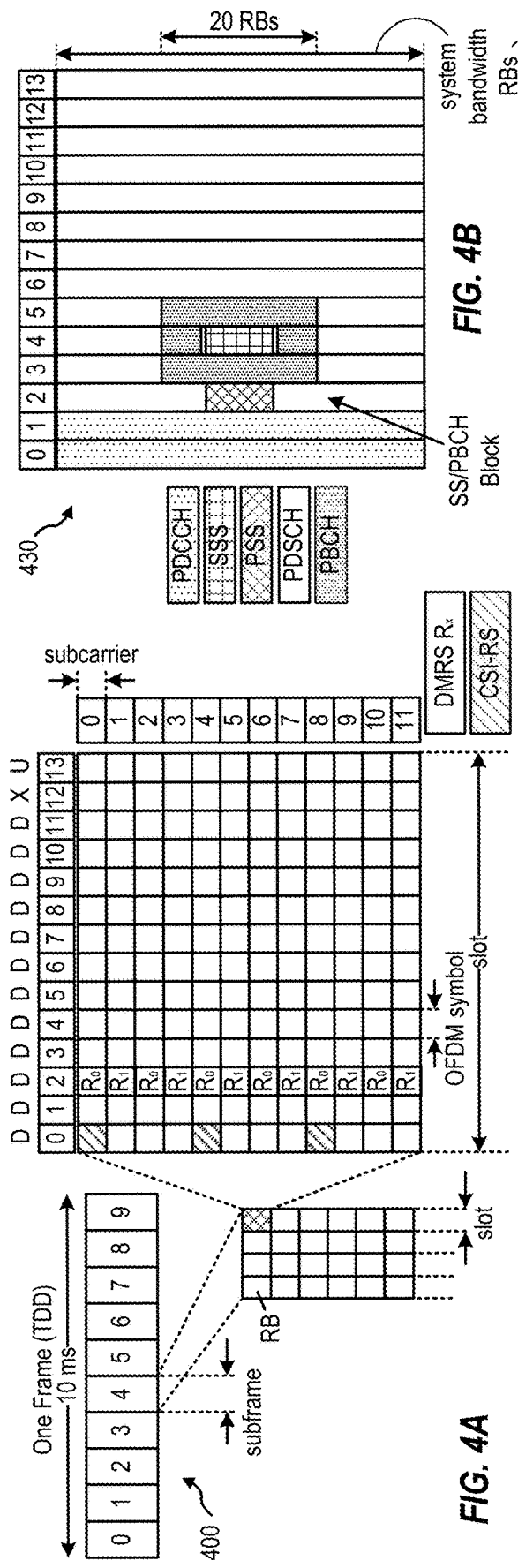
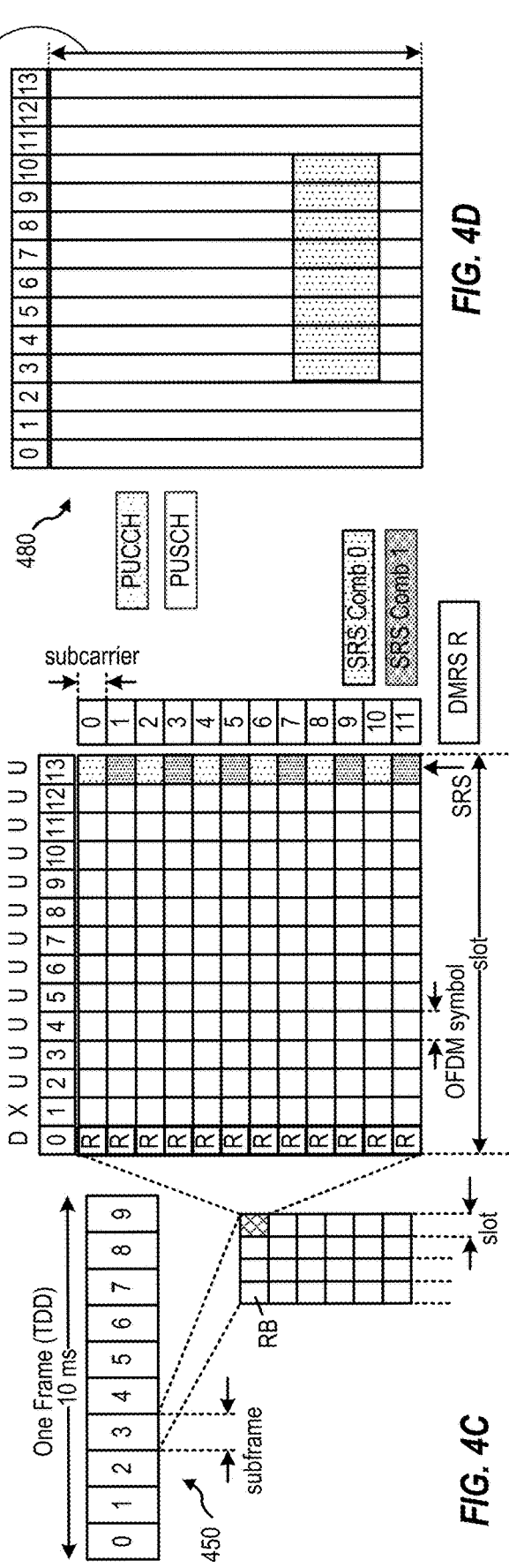
FIG. 4A
FIG. 4B
FIG. 4C
FIG. 4D

800

| Non-RedCap initial DL BWP | RedCap initial DL BWP | RedCap non-initial DL BWP |
|---|---|---|
| Contains SSB, RACH CSS & CORESET0 | Contains RACH CSS Does not contain SSB | May/may not contain SSB and system info |

```
MIB ::=                          SEQUENCE {
    systemFrameNumber                BIT STRING (SIZE (6)),
    subCarrierSpacingCommon          ENUMERATED {scs15or60, scs30or120},
    ssb-SubcarrierOffset             INTEGER (0..15),
    dmrs-TypeA-Position              ENUMERATED {pos2, pos3},
    pdcch-ConfigSIB1                 PDCCH-ConfigSIB1,
    cellBarred                       ENUMERATED {barred, notBarred},
    intraFreqReselection             ENUMERATED {allowed, notAllowed},
    spare                            BIT STRING (SIZE (1))
}
```
⟵ 905

FIG. 9A

```
ASN1START
TAG-BCCH-BCH-MESSAGE-START

BCCH-BCH-Message ::=             SEQUENCE {
    message                          BCCH-BCH-MessageType
}

BCCH-BCH-MessageType ::=          CHOICE {
    mib                              MIB,
    messageClassExtension            SEQUENCE {}
}

TAG-BCCH-BCH-MESSAGE-STOP
ASN1STOP
```
⟵ 910

FIG. 9B

IDLE/INACTIVE MODE PROCEDURES FOR REDUCED CAPABILITY USER EQUIPMENT

BACKGROUND

Field of the Disclosure

Aspects of the present disclosure relate to wireless communications, and more particularly, to techniques for certain procedures involving a user equipment (UE).

Description of Related Art

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available wireless communication system resources with those users Although wireless communication systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communication systems, increasing the ability for different types of devices to intercommunicate, increasing the number and type of wireless communication mediums available for use, and the like. Consequently, there exists a need for further improvements in wireless communications systems to overcome the aforementioned technical challenges and others.

SUMMARY

One aspect provides a method for wireless communication by a user equipment (UE), including receiving, from a network entity, a configuration for a first downlink (DL) bandwidth part (BWP), a first control resource set (CORESET) configured on the first DL BWP, and one or more first search space (SS) sets within the first CORESET; receiving, from the network entity, a configuration for a second downlink BWP, a second CORESET configured on the second DL BWP, and one or more second SS sets within the second CORESET; receiving signaling configuring the UE for physical downlink control channel (PDCCH) monitoring adaptation; and monitoring for PDCCHs, subject to the PDCCH monitoring adaptation, when performing one or more idle mode or inactive mode procedures on at least one of the first DL BWP or the second DL BWP.

One aspect provides a method for wireless communication by a network entity, including transmitting, to a UE, a configuration for a first DL BWP, a first CORESET configured on the first DL BWP, and one or more first SS sets within the first CORESET; transmitting, to the UE, a configuration for a second downlink BWP, a second CORESET configured on the second DL BWP, and one or more second SS sets within the second CORESET; transmitting signaling configuring the UE for PDCCH monitoring adaptation; and transmitting PDCCHs, subject to the PDCCH monitoring adaptation, when participating with the UE in one or more idle mode or inactive mode procedures on at least one of the first DL BWP or the second DL BWP.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communication network.

FIG. 9A and FIG. 9B depict options for look up table (LUT) based resource mapping, in accordance with aspects of the present disclosure.

DETAILED DESCRIPTION

Aspects of the present disclosure provide apparatuses, methods, processing systems, and computer-readable mediums for performing various procedures by a UE that may be configured to operate in a bandwidth part (BWP) that may be reserved for UEs of a certain type, such as an initial downlink BWP reserved for reduced capacity (RedCap) UEs.

Different types of UEs may have capabilities tailored to suit certain objectives. For example, some UEs may be designed to be scalable and deployable in a more efficient and cost-effective way. These types of UEs may have reduced capabilities (RedCap) relative to conventional (more expensive) UEs, such as high-end smart phones. RedCap UEs may have reduced latency and/or reliability requirements.

A network may configure a separate frequency resources, referred to as bandwidth parts (BWPs) for RedCap UEs to perform certain functions, such as random access channel (RACH) procedures. In some cases, a RedCap UE may have only a single radio (e.g., to control cost), meaning it may be able to operate on only one BWP at a time. This may present certain challenges, however, as it may require the UE to retune its radio to receive certain types of signals used for certain purposes.

For example, the network may configure a RedCap UE with a downlink BWP (a DL BWP dedicated for RedCap UEs) that does not have certain signals transmitted therein. The DL BWP may be configured for the UE to perform certain idle or inactive mode procedures. However, the DL BWP may not be configured with certain DL signals which may present a challenge. For example, in some cases, synchronization signal blocks (SSBs) may not be transmitted in an initial DL BWP. In such cases, a RedCap UE may need to perform BWP switching, to a conventional BWP used by RedCap and non-RedCap UEs, to detect SSBs for various purposes. Managing procedures involving different BWPs presents a challenge, as BWP switching consumes power and may increase latency of certain procedures.

Aspects of the present disclosure, however, provide various signaling mechanisms that may help improve the flexibility of various RedCap UE procedures, such as cell selection and cell re-selection, subject to the restriction on reduced UE complexity. In some cases, the mechanism may help limit or avoid BWP switching when performing such procedures, which may help reduce latency and power consumption when performing such procedures.

Introduction to Wireless Communication Networks

The techniques and methods described herein may be used for various wireless communications networks. While aspects may be described herein using terminology commonly associated with 3G, 4G, and/or 5G wireless technologies, aspects of the present disclosure may likewise be applicable to other communication systems and standards not explicitly mentioned herein.

Figure 1:
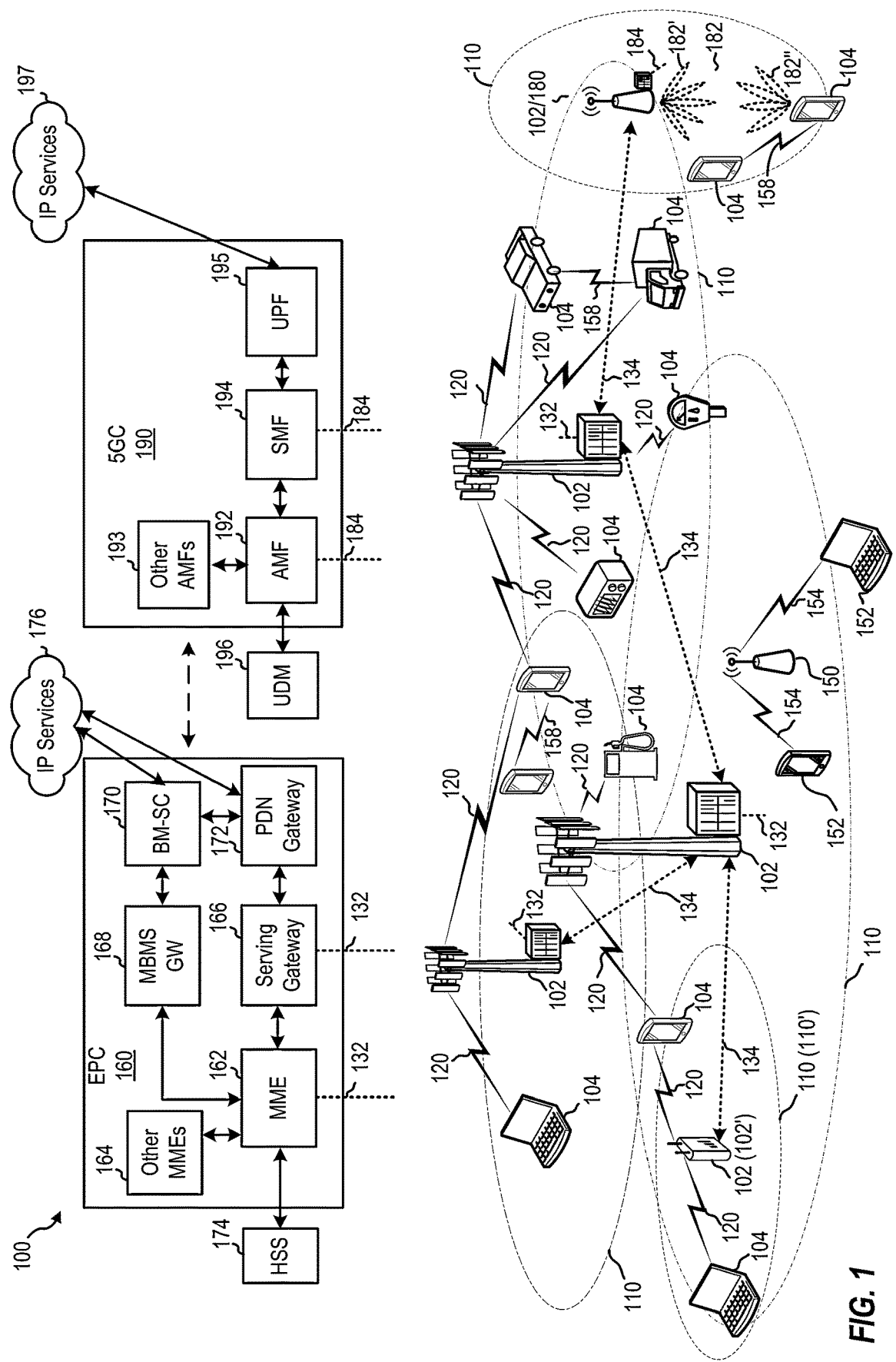
FIG. 1 depicts an example wireless communication network.

FIG. 1 depicts an example of a wireless communication network 100, in which aspects described herein may be implemented.

Generally, wireless communication network 100 includes various network entities (alternatively, network elements or network nodes). A network entity is generally a communications device and/or a communication function performed by a communications device. For example, various functions of a network as well as various devices associated with and interacting with a network may be considered network entities.

In the depicted example, wireless communication network 100 includes base stations (BSs) 102, user equipments (UEs) 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with UEs 104 via communications links 120. The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and others. Each of BSs 102 may provide communication coverage for a respective geographic coverage area 110, which may sometimes be referred to as a cell, and which may overlap in some cases (e.g., small cell 102' may have a coverage area 110' that overlaps the coverage area 110 of a macro cell). ABS may, for example, provide communication coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
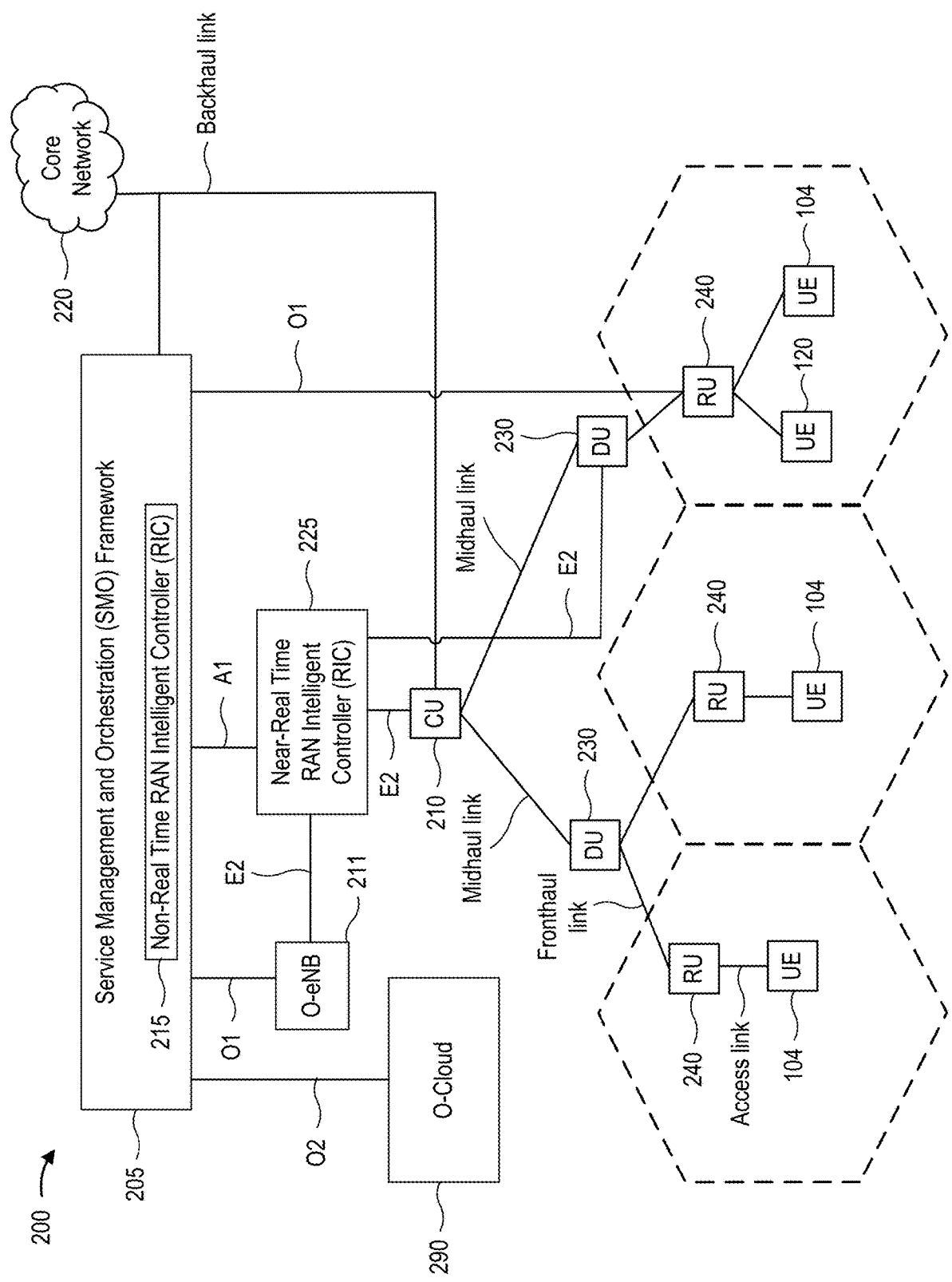
FIG. 2 depicts an example disaggregated base station architecture.

While BSs 102 are depicted in various aspects as unitary communications devices, BSs 102 may be implemented in various configurations. For example, one or more components of base station may be disaggregated, including a central unit (CU), one or more distributed units (DUs), one or more radio units (RUs), a radio unit (RU), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communication network 100 may also be configured to support different radio access technologies, such as 3G, 4G, and 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communication network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communication links 120 between BSs 102 and, for example, UEs 104, may be through one or more carriers, which may have different bandwidths (e.g., 5, 10, 15, 20, 100, 400, and other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". BS 180 may also receive the beamformed signal from UE 104 in one or more receive directions 182'. Base station 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communication network 100 further includes a Wi-Fi AP 150 in communication with Wi-Fi stations (STAs) 152 via communication links 154 in, for example, a 2.4 GHz and/or 5 GHz unlicensed frequency spectrum.

Certain UEs 104 may communicate with each other using device-to-device (D2D) communication link 158. D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172 in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
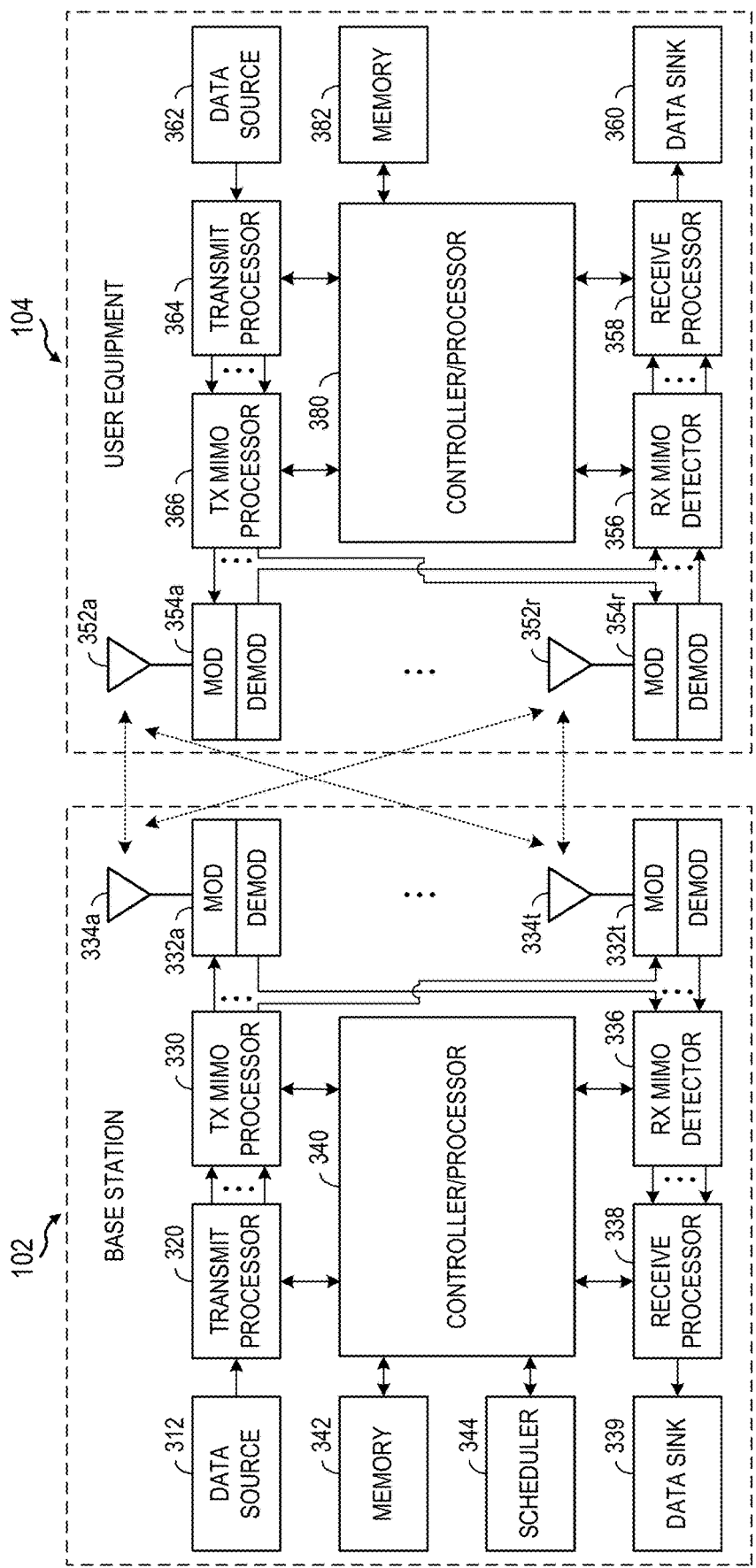
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., data source 362) and wireless reception of data (e.g., data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a-332t*. Each modulator in transceivers 332*a-332t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a-332t* may be transmitted via the antennas 334*a-334t*, respectively.

In order to receive the downlink transmission, UE 104 includes antennas 352*a-352r* that may receive the downlink signals from the BS 102 and may provide received signals to the demodulators (DEMODs) in transceivers 354*a-354r*, respectively. Each demodulator in transceivers 354*a-354r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a-354r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a-354r* (e.g., for SC-FDM), and transmitted to BS 102.

At BS 102, the uplink signals from UE 104 may be received by antennas 334*a-t*, processed by the demodulators in transceivers 332*a-332t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communication network, such as wireless communication network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communication systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and in the time domain with SC-FDM.

A wireless communication frame structure may be frequency division duplex (FDD), in which for a particular set of subcarriers and subframes within the set of subcarriers are dedicated for either DL or UL. Wireless communication frame structures may also be time division duplex (TDD), in which for a particular set of subcarriers and subframes within the set of subcarriers are dedicated for both DL and UL.

In FIGS. 4A and 4C, the wireless communication frame structure is TDD where D is DL, U is UL, and X is flexible for use between DL/UL. UEs may be configured with the slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot configuration. Subframes may also include mini-slots, which generally have fewer symbols than an entire slot. Other wireless communication technologies may have a different frame structure and/or different channels.

Generally, the number of slots within a subframe is based on a slot configuration and a numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and channel state information reference signals (CSI-RS) for channel estimation at the UE. The RS may also include beam measurement RS (BRS), beam refinement RS (BRRS), and phase tracking RS (PT-RS).

FIG. 4B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may also transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example Reduced Capability (RedCap) UE

Various technologies may be the focus of current wireless communication standards. For example, Rel-15 and/or Rel-16 may focus on premium smartphones (e.g., enhanced mobile broadband (eMBB)), and other verticals such as ultra-reliable low latency communication (URLLC) and/or vehicle-to-everything (V2X) communications. In some wireless communication standards (e.g., Rel-17 and beyond) there may exist a strong desire for new radio (NR) to be scalable and deployable in a more efficient and cost-effective way. Thus, a new UE type with reduced capabilities (RedCap) has been introduced. RedCap UE may exhibit a relaxation of peak throughput (e.g., 20 MHz), as well as lower latency and/or reliability requirements. Also, the RedCap UE may involve lower device cost (and complexity) and improved efficiency (e.g. power consumption, system overhead, and cost improvements) as compared to high-end devices, such as high-end eMBB and URLCC devices of 5G NR Rel-15/16 (e.g., high-end smartphones). In some cases, a cell may allow access for a RedCap UE. A network can configure a separate initial UL BWP for RedCap UEs in a system information block (SIB) which may be used both during and after initial access. A RedCap UE may not be configured to support a BWP wider than the maximum bandwidth of the initial BWP for the RedCap UE; however, a non-RedCap UE, which may share an initial UL BWP with the RedCap UE, is allowed to exceed the maximum bandwidth of the initial BWP. The RedCap UE may switch to a non-initial BWP by using the BWP switching mechanisms described in FIG. 8 below.

For many use cases, a RedCap UE may be implemented with a device design having a more compact form factor. RedCap UEs may also support frequency range (FR) 1 and/or 2 bands for frequency division duplexed (FDD) and/or time division duplexed (TDD) communications. For F1, a basic BWP operation with restriction may be used as a starting point for RedCap UE capability. Alternatively, basic BWP operation without restriction may be used as a starting point for RedCap UE capability. For FR1 in TDD, center frequencies may be the same for the initial DL and UL BWPs used during random access for RedCap UEs. Center frequencies may be the same for a non-initial DL and UL BWPs with the same BWP identifier (BWP ID) for a RedCap UE.

Thus, some design objectives of the NR RedCap UE may include scalable resource allocation, coverage enhancement for DL and/or UL, power saving in all RRC states, and/or co-existence with the NR premium UE.

Figure 5:
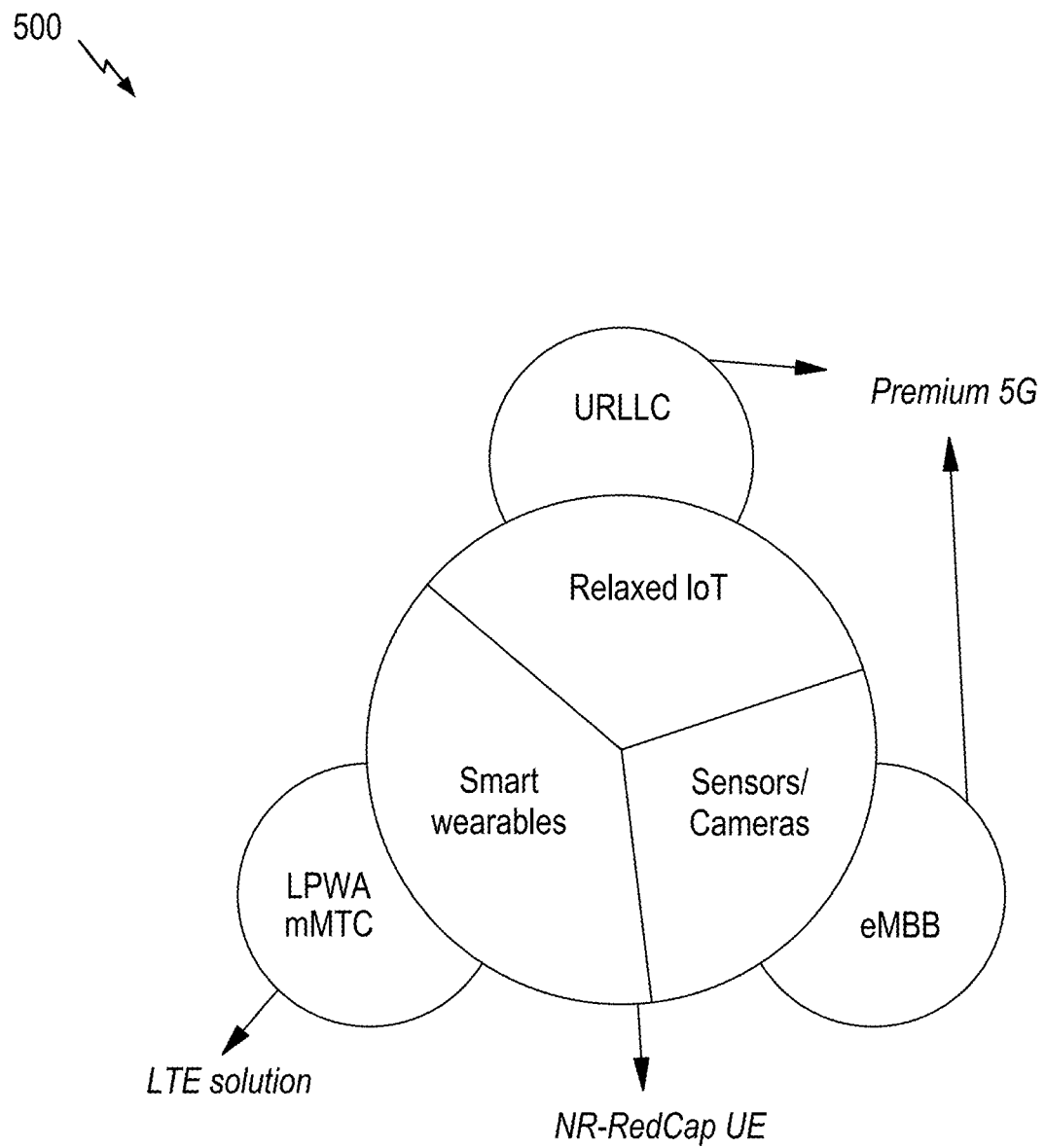
FIG. 5 depicts an example new radio (NR) reduced capability (RedCap) user equipment (UE).

As shown in FIG. 5, an NR-RedCap UE may be a smart wearable device, a sensor/camera, or any other device configured for relaxed internet-of-things (IoT) communications. Further, a RedCap UE functionality and/or capability may overlap with those of long term evolution (LTE) and/or fifth generation (5G) devices (e.g., premium 5G devices). For example, the functionality of relaxed IoT devices may overlap with that of URLLC devices, the functionality of smart wearable devices may overlap with that of low power wide area (LPWA) massive machine type communication (mMTC) devices, and/or the functionality of sensors/cameras may overlap with that of eMBB devices.

Example RACH Procedures

A random-access channel (RACH) is so named because it refers to a wireless channel (medium) that may be shared by multiple UEs and used by the UEs to (randomly) access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network.

Figure 6B:
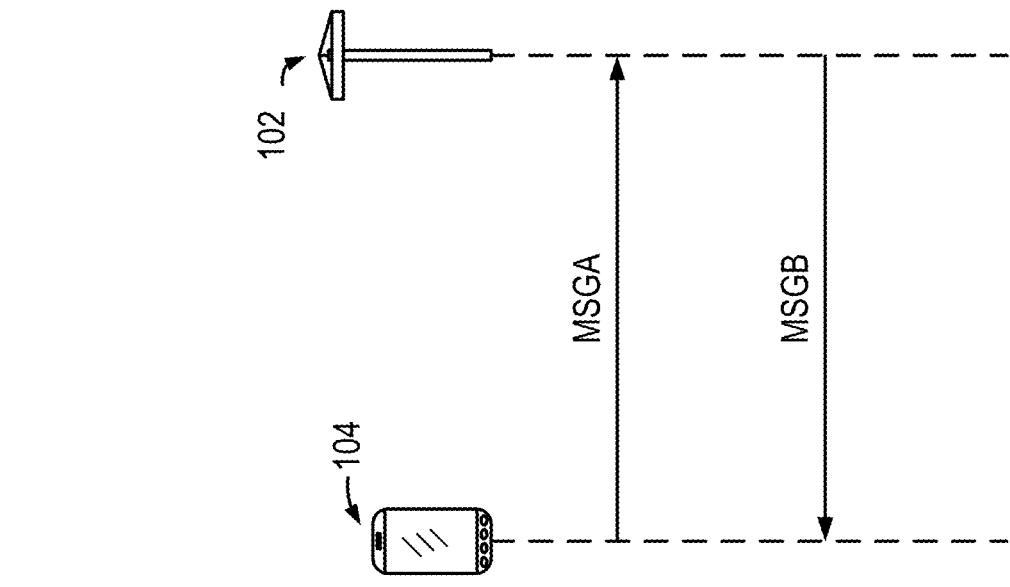
FIG. 6A and FIG. 6B depict call flow diagrams for 2-step and 4-step random access channel (RACH) procedures, respectively.
Figure 6A:
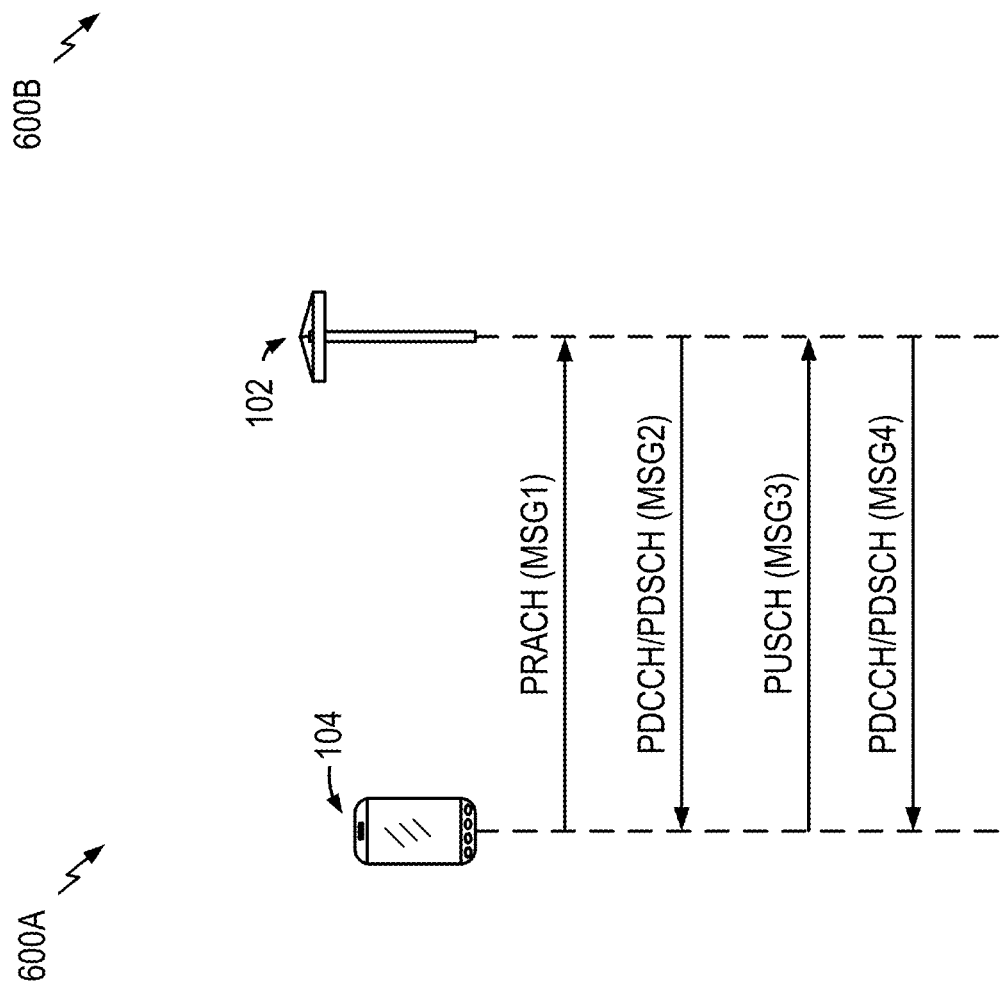

FIG. 6A is a timing (or "call-flow") diagram 600A illustrating an example four-step RACH procedure, in accordance with certain aspects of the present disclosure. A first message (MSG1) may be sent from the UE 104 to BS 102 on the physical random access channel (PRACH). In this case, MSG1 may only include a RACH preamble. BS 102 may respond with a random access response (RAR) message (MSG2) which may include the identifier (ID) of the RACH preamble, a timing advance (TA), an uplink grant, cell radio network temporary identifier (C-RNTI), and a back off indicator. MSG2 may include a PDCCH communication including control information for a following communication on the PDSCH, as illustrated. In response to MSG2, MSG3 is transmitted from the UE 104 to BS 102 on the PUSCH. MSG3 may include one or more of a RRC connection request, a tracking area update request, a system information request, a positioning fix or positioning signal request, or a scheduling request. The BS 110 then responds with MSG4 which may include a contention resolution message.

In some cases, to speed access, a two-step RACH procedure may be supported. As the name implies, the two-step RACH procedure may effectively "collapse" the four messages of the four-step RACH procedure into two messages.

FIG. 6B is a call flow diagram 600B illustrating an example two-step RACH procedure, in accordance with certain aspects of the present disclosure. A first enhanced message (msgA) may be sent from the UE 104 to BS 102. In certain aspects, msgA includes some or all the information from MSG1 and MSG3 from the four-step RACH procedure, effectively combining MSG1 and MSG3. For example, msgA may include MSG1 and MSG3 multiplexed together such as using one of time-division multiplexing or frequency-division multiplexing. In certain aspects, msgA includes a RACH preamble for random access and a payload. The msgA payload, for example, may include the UE-ID and other signaling information (e.g., buffer status report (BSR)) or scheduling request (SR). BS 102 may respond with a random access response (RAR) message (msgB) which may effectively combine MSG2 and MSG4 described above. For example, msgB may include the ID of the RACH preamble, a timing advance (TA), a back off indicator, a contention resolution message, UL/DL grant, and transmit power control (TPC) commands.

In a two-step RACH procedure, the msgA may include a RACH preamble and a payload. In some cases, the RACH preamble and payload may be sent in a msgA transmission occasion.

The random access message (msgA) transmission occasion generally includes a msgA preamble occasion (for transmitting a preamble signal) and a msgA payload occasion for transmitting a PUSCH. The msgA preamble transmission generally involves:
 (1) selection of a preamble sequence; and
 (2) selection of a preamble occasion in time/frequency domain (for transmitting the selected preamble sequence).

The msgA payload transmission generally involves:
 (1) construction of the random access message payload (DMRS/PUSCH); and
 (2) selection of one or multiple PUSCH resource units (PRUs) in time/frequency domain to transmit this message (payload).

In some cases, a UE monitors SSB transmissions which are sent (by a gNB using different beams) and are associated with a finite set of time/frequency resources defining RACH occasions (ROs) and PRUs. Upon detecting an SSB, the UE may select an RO and one or more PRUs associated with that SSB for a MSG1/msgA transmission. In some cases, a RO associated with the detected SSB falls within a RedCap UE bandwidth, and the RedCap UE may utilize a separate initial UL BWP for RedCap (which is not expected to exceed the maximum RedCap UE bandwidth) which may include ROs for RedCap UEs. ROs may be dedicated for RedCap UEs or shared with non-RedCap UEs. The finite set of ROs and PRUs may help reduce monitoring overhead (blind decodes) by a base station.

There are several benefits to a two-step RACH procedure, such as speed of access and the ability to send a relatively small amount of data without the overhead of a full four-step RACH procedure to establish a connection (when the four-step RACH messages may be larger than the payload).

The two-step RACH procedure can operate in any RRC state and any supported cell size. Networks that uses two-step RACH procedures can typically support contention-based random access (CBRA) transmission of messages (e.g., msgA) within a finite range of payload sizes and with a finite number of MCS levels.

Figure 7:
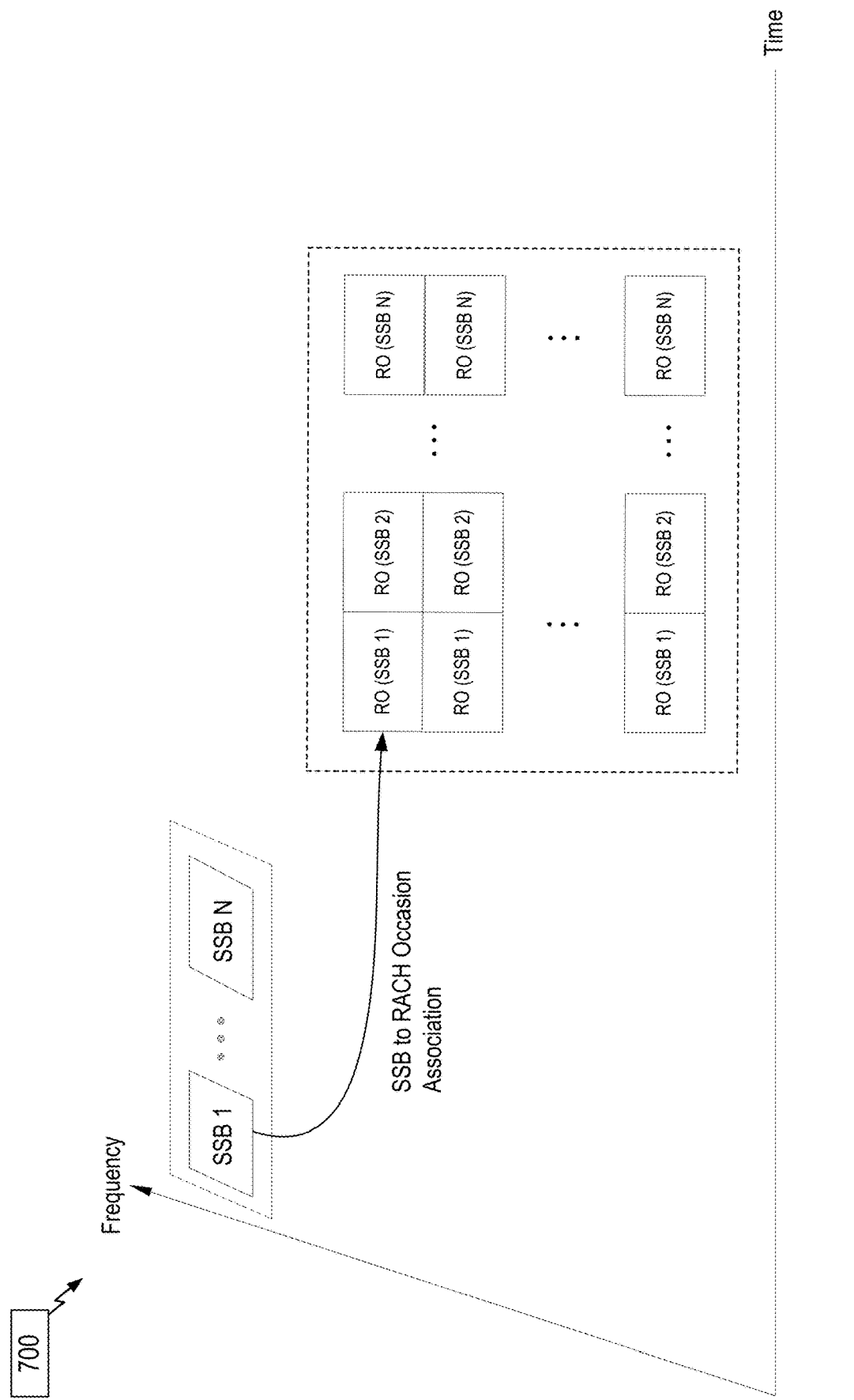
FIG. 7 illustrates an example association of SSBs to RACH occasions (ROs).

After a UE has selected an SSB (beam), for that SS block there is a predefined one or more ROs with certain time and frequency offset and direction (e.g., specific to the selected SSB). FIG. 7 illustrates an example association (mapping) between SSBs and ROs.

This SSB to RO association is used for the gNB to know what beam the UE has acquired/is using (generally referred to as beam establishment). One SSB may be associated with one or more ROs or more than one SSB may be associated with one RO. Association is typically performed in the frequency domain first, then in the time domain within a RACH slot, then in the time domain across RACH slots (e.g., beginning with lower SSB indexes). An association period is typically defined as a minimum number of RACH configuration periods, such that all (configured) SSB beams are mapped into ROs.

Overview of Dedicated RedCap BWPs

Figure 8:
FIG. 8 illustrates example features for RedCap and non-RedCap bandwidth parts (BWPs).

Due to differences in capability, RedCap UEs (due to their low bandwidth capability) and conventional (e.g., non-RedCap or Legacy) UEs may be configured to operate in bandwidth parts (BWPs) with different features. The table 800 in FIG. 8 summarizes some of the different features. For example, a conventional, non-RedCap initial downlink (DL) BWP may contain SSBs, RACH common search space (CSS) and CORESET0. As illustrated in FIG. 8, RedCap initial DL BWP may contain, for example, the RACH CSS, but may not contain SSBs, CORESETs (e.g., CORESET0, CORESET for paging), and/or system information blocks (SIB). In other cases, a RedCap UE may not contain the RACH CSS, but may contain CORESETs (e.g., CORESET0). Similarly, the RedCap non-initial DL BWP may not contain SSB or system information, and may be unable to access this information. Though operating without certain information may significantly reduce the complexity of a RedCap UE, a RedCap UE operating in these BWPs without access to information (e.g., SSBs) may not get the benefit of the information while operating on the BWP.

As a result, a RedCap UE operating in these BWPs may not get the benefit of SSBs. Aspects of the present disclosure, however, may allow a RedCap UE to implement an extended timelines, allowing the RedCap UE to switch to a different BWP (e.g., to a non-RedCap initial DL BWP) during a RACH procedure to monitor for SSBs. After detecting an SSB, the RedCap UE may then return (e.g., to the RedCap initial BWP) to resume the RACH procedure.

Thus, the techniques presented herein may help address a potential issue that is caused by the RedCap UE not being able to measure and track SSBs during a RACH procedure. The potential issue may be caused because, if the UE fails to receive a RAR after sending a RACH preamble and the UE is not allowed to monitor SSBs, the UE would have to re-select RACH resources using the same SSB during RACH retransmission (despite the previous failure). In certain cases, failure to track and measure SSBs in a RedCap BWP, may result in CORESET sets and CSS sets (e.g., for paging, small data transmission, random access, etc.) failing to be configured at a UE.

In some cases, the UE may be able to increase power ramping counter during RACH retransmission, but cannot change SSBs. This may lead to UE congestion during RACH retransmissions when, for example, other UEs may be reusing the same SSB for RACH transmission.

In general, a conventional RedCap UE is not be able to track SSBs from the time of an initial Msg1 transmission until the time the NW configures it with an active BWP (that contains non-cell-defining SSB) through RRC. As a result, a UE may not be able to receive and transmit messages properly during the RACH procedure.

In FR1 and FR2, if a separate initial DL BWP is configured for random access, but not paging, a RedCap UE in idle/inactive mode, may not expect that DL BWP to contain SSBs (e.g., cell defining SSBs or CD-SSBs), CORESET #0, or SIB transmissions. Because of this, it may be assumed a RedCap UE performing random access in the separate DL BWP may not need to monitor for paging in a BWP containing CORESET #0.

If an initial DL BWP is configured for paging, the RedCap UE may expect the DL BWP to contain non-cell defining SSBs (NCD-SSBs) for a serving cell, but not CORESET #0 or SIB. If a separate SIB0 configured initial DL BWP contains the entire CORESET #0, the RedCap UE may use the bandwidth and location of the CORESET #0 during initial access. In such cases, NCD-SSB periodicity may not be required to be the same as that of CD-SSB (although NCD-SSB periodicity may be expected to not be less than the CD-SSB periodicity). If a separate initial DL BWP is configured to contain the entire CORESET #0, the RedCap UE may expect CD-SSB in this DL BWP. In some cases, the network may configured SSB or MIB-configured CORESET #0 or SIB1 to be within the initial DL BWP.

Aspects Related to RedCap Cell
Selection/Re-Selection Procedures

Aspects of the present disclosure provide apparatuses, methods, processing systems, and computer-readable mediums for performing various procedures by a UE that may be configured to operate in a bandwidth part (BWP) that may be reserved for UEs of a certain type, such as an initial downlink BWP reserved for reduced capacity (RedCap) UEs.

As noted above, in both FR1 and FR2, a separate initial DL BWP can be configured for idle/inactive RedCap UE via SIB. The configuration of this DL BWP may be subject to a maximum UE bandwidth (BW) supported by the RedCap UE. Such a separate initial DL BWP may configured by the network, for example, to mitigate the potential resource fragmentation of a linked initial UL BWP or for offloading the DL traffic from MIB-configured CORESET #0.

If the RedCap-specific initial DL BWP does not contain the entire CORESET #0 configured by MIB, separate CORESET(s) and SS set(s) may be configured in the RedCap-specific initial DL BWP for idle/inactive mode procedures. In such cases, SSB may or may not be transmitted in the RedCap-specific initial DL BWP. In some cases, both common search space (CSS) and UE-specific (USS) sets may be configured for inactive mode procedures. Such procedures may include configured grant small data transmission (CG-SDT), hybrid automatic repeat request (HARQ) retransmission of multicast and broadcast services (MBS), and mobile terminated SDG (MT-SDT) procedures.

Aspects of the present disclosure provide mechanisms that may help support RedCap UEs and may help improve the flexibility of RedCap UE procedures, such as cell selection/re-selection subject to the restriction on reduced UE complexity. The mechanisms may provide enhancements of RedCap UE cell selection and re-selection procedures.

In some cases, for initial cell selection on NR frequencies, a RedCap UE may scan a sync raster and search for a suitable cell of the selected public land mobile network (PLMN) or a Stand-alone Non-Public Network (SNPN). The UE may measure CD-SSBs and acquire MIB/SIB to find if the cell allows RedCap UE to access. If a cell does allow the RedCap UE to access, the RedCap UE may be provided with RedCap-specific cell selection criterion and a list of neighbor cells in SIB (e.g., neighbor cells that also allow RedCap UE access).

If an initial DL BWP is separately configured for the RedCap UE, this configuration information may also be indicated in SIB. This configuration information may include, for example, a location, numerology and BW of the BWP and CORESET/CSS sets configured for idle mode procedures (e.g. random access, paging, broadcast/multicast). FIGS. 10-13 are examples of how BWP and CORESET/CSS sets may be configured within operating (carrier) BW. The configuration information may also include TX power, periodicity and transmission pattern of DL RS broadcast/multicast to RedCap UE within the BWP (e.g. CD-SSB, NCD-SSB, or other DL RS).

Depending on UE capability and initial DL BWP configuration, the intra/inter-frequency cell selection/re-selection of RedCap UE may be based on measurements of one or multiple DL RS received in idle/inactive state. These DL RS may include, for example, one or a combination of CD-SSB, NCD-SSB transmitted in the RedCap-specific initial DL BWP, and other broadcast/multicast DL RS (different from CD-SSB and NCD-SSB) transmitted in the RedCap-specific initial DL BWP, which are quasi co-located (QCL'ed) with CD-SSB or NCD-SSB. Example of these other broadcast/multicast DL RS include CSI-RS/TRS, DMRS for multicast/broadcast PDSCH and the scheduling PDCCH.

Aspects of the present disclosure also provide various options for how a RedCap UE may determining resource mapping for CORESET #0.

For example, on some frequency bands that support narrow channel BW of UE, the resource mapping for CORESET #0 (including SSB and CORESET #0 multiplexing pattern, number of RBs for CORESET #0, number of symbols for CORESET #0 and the frequency offset between CORESET #0 and CD-SSB) can be mapped to one or more look up tables (LUTs).

In such cases, using a LUT based mapping, a UE can determine the resource mapping for CORESET #0 by finding frequency position and numerology of CD-SSB and, based on a numerology of CORESET #0 indicated by MIB of CD-SSB, the UE may find an index into a LUT for SSB/CORESET #0 multiplexing.

In some cases, the index of LUT may be obtained from a demodulation reference signal (DMRS) scrambling ID or the payload of PBCH. For example, as illustrated in FIG. 9A, in some cases the index of LUT may be indicated by a spare bit in MIB payload. As illustrated in FIG. 9B, the index of LUT may also be indicated by BCCH-BCH-Message Type Indicator mapped to MIB payload.

In other cases, the index of the LUT may be obtained from an ssb-SubcarrierOffset (e.g. LSB, MSB, even/odd), an RRC message type indicator of MIB (1 bit appended to MIB payload by upper layer), half frame index of a SSB burst (mapped to 8-bit PHY payload of PBCH), a DMRS position indicated by MIB, or a system frame number (SFN) index.

From the LUT, the UE may find an index for CORESET #0 resource mapping from pdcch-ConfigSIB1 field in MIB. The LUT may, for example, be any suitable LUT (such as the LUTs specified by TS 38.213). For cell selection/re-selection, the UE may need to decode the SIB of serving cell and neighbor cells. To decode the SIB, the UE may need\to find the CORESET #0 associated with the scheduling PDCCH of SIB. After finding the SCS for SS/PBCH block and CORESET #0/PDCCH, the UE may need to determine which LUT should be used to look up the resource mapping for CORESET #0.

Aspects of the present disclosure also provide various options for how a RedCap UE may perform reference signal receive power (RSRP) and reference signal receive quality (RSRQ) for idle/inactive mode procedures. The RSRP and RSRQ measurements may be based on various DL RS configured in RedCap-Specific Initial DL BWP.

Figure 10:
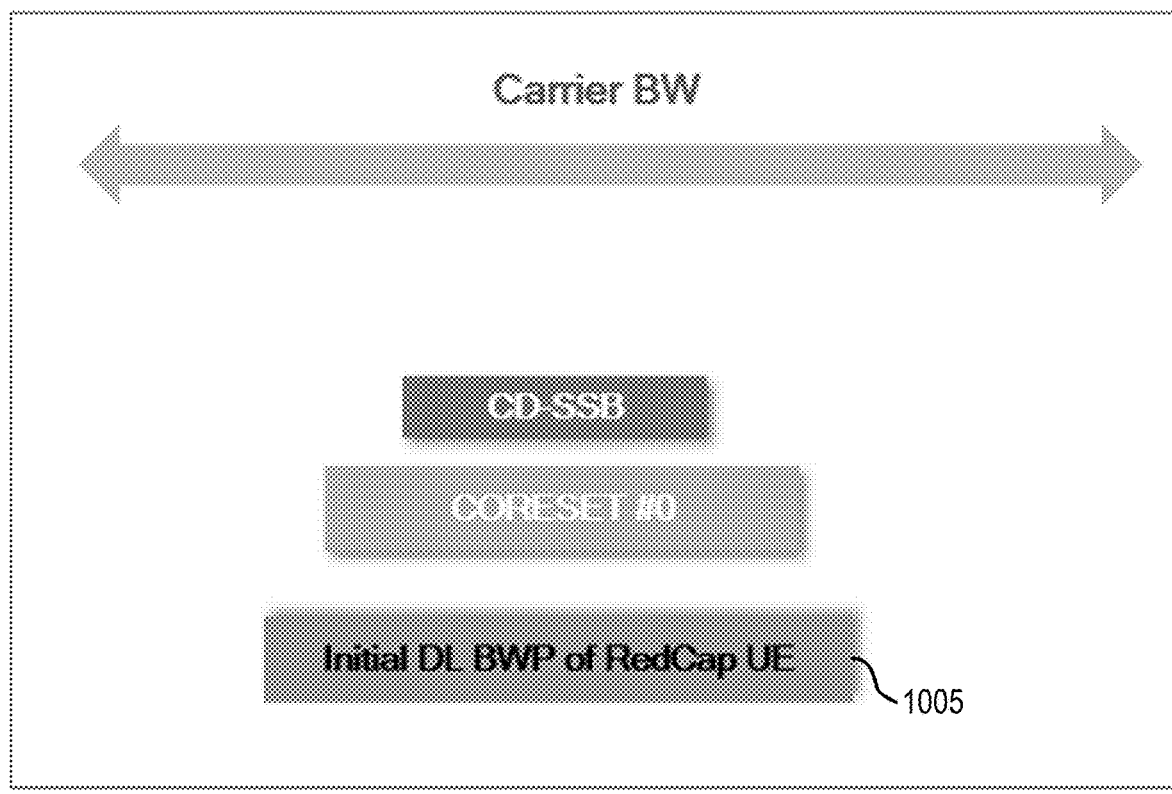
FIGS. 10-13 depict examples of downlink reference signals (DL-RS) in RedCap-Specific initial downlink bandwidth parts (DL-BWP), in accordance with aspects of the present disclosure.
Figure 11:
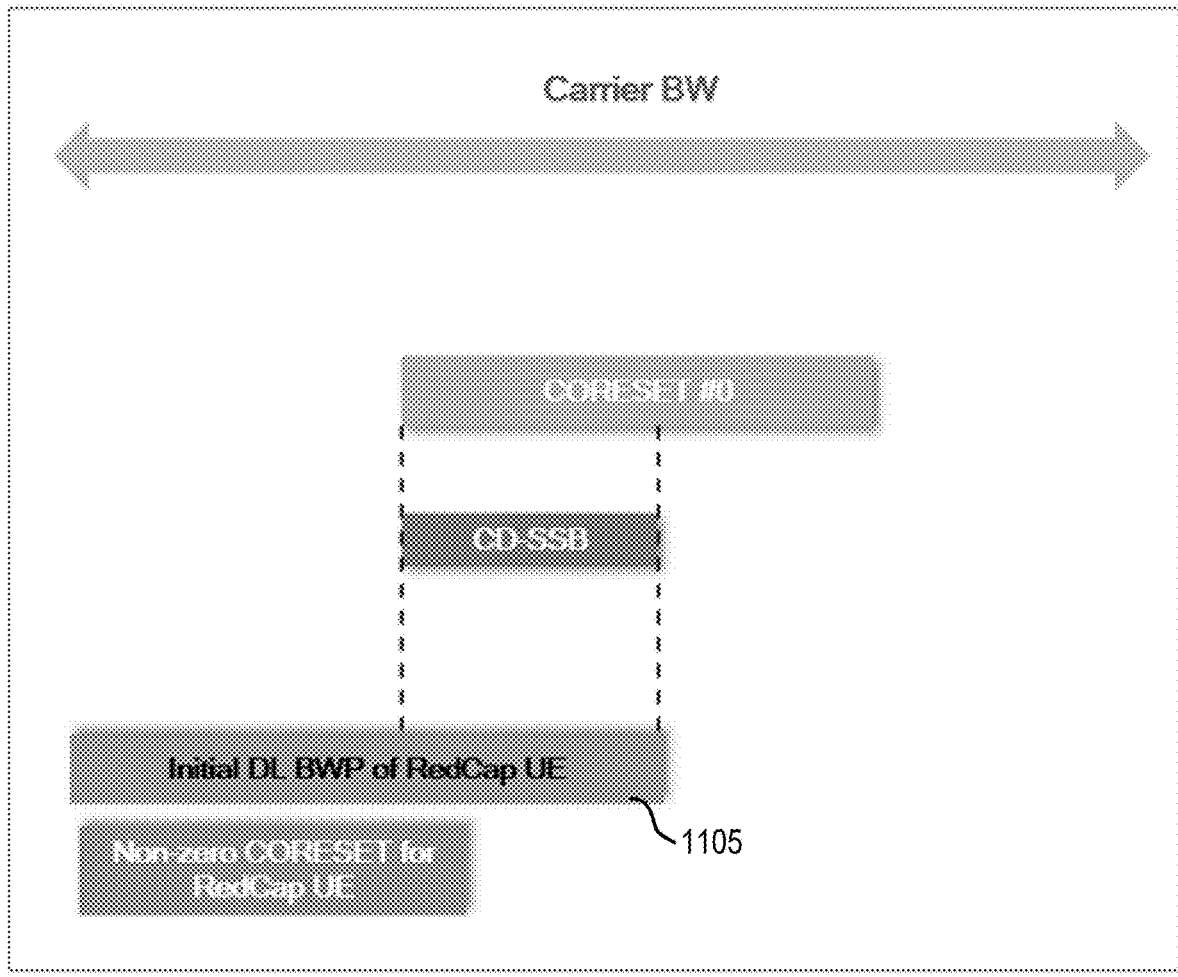
Figure 12:
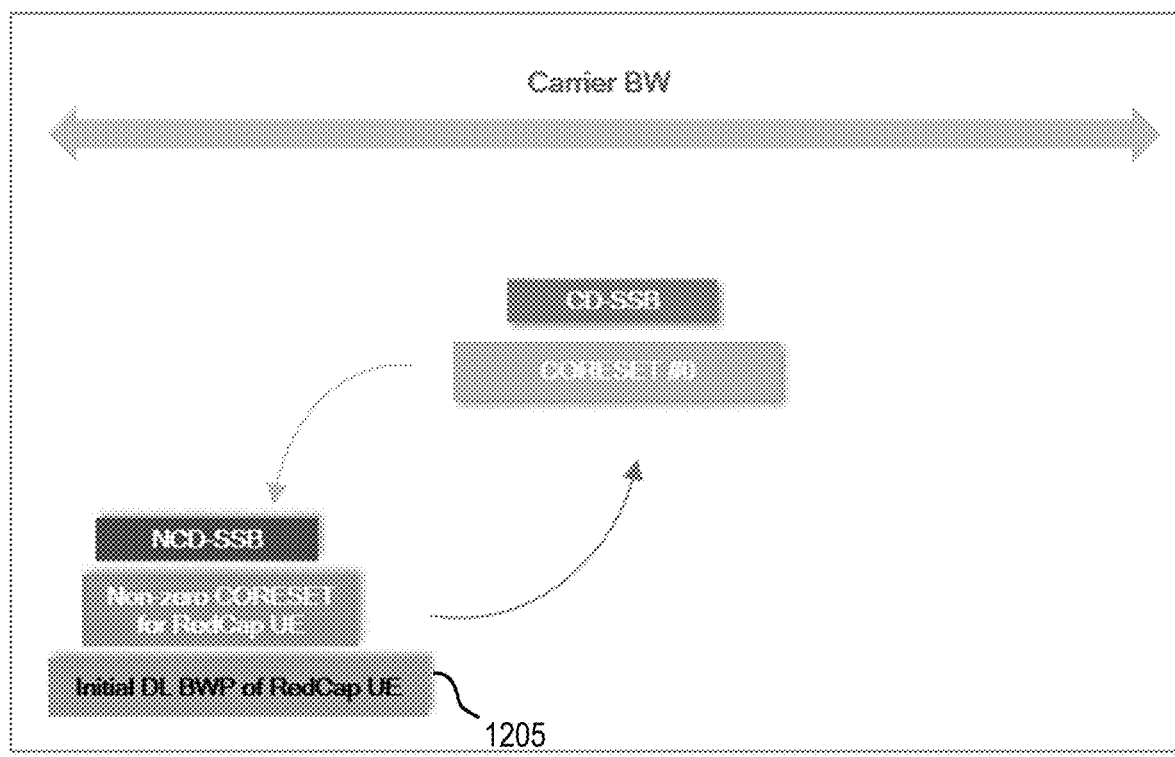
Figure 13:
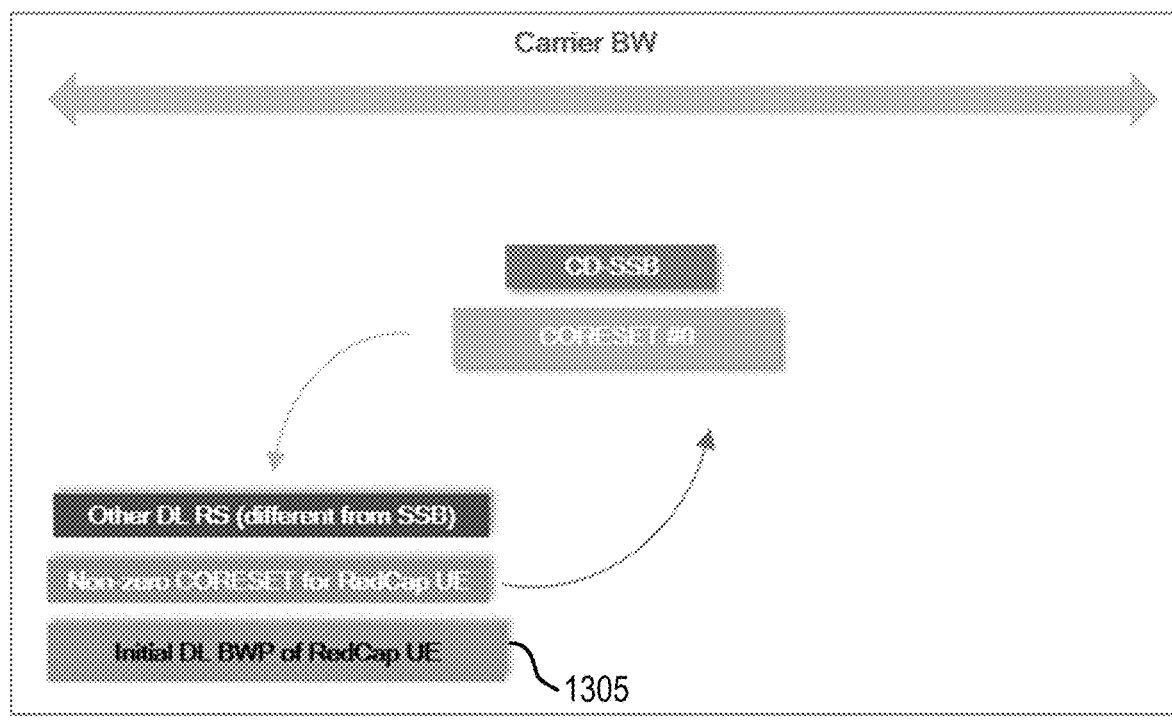

As illustrated in FIG. 10, in some cases, CD-SSB way be configured in initial DL BWP 1005 that contains all of CORESET #0. As illustrated in FIG. 11, in some cases, CD-SSB way be configured in initial DL BWP 1105 that contains only part of CORESET #0. As illustrated in FIG. 12, in some cases, CD-SSB way be configured in a separate BWP that contains CORESET #0, while initial DL BWP 1205 may be configured with NCD-SSB and a non-zero CORESET for RedCap UEs. As illustrated in FIG. 13, in some cases, initial DL BWP 1305 may be configured with other DL RS (e.g., different from SSBs).

These SSB and/or other DL RS broadcast/multicast to the RedCap UE in the separate initial DL BWP may be used as a QCL source of DL channels/signals and for spatial relation of UL channels/signals.

If SI acquisition, paging, and random access procedures of an idle/inactive RedCap UE are distributed across multiple DL BWPs (e.g. SI acquisition in CORESET #0, paging/RA in another separately configured initial DL BWP), RSRP/RSRQ measurements can be based on various options. According to a first option, RSRP/RSRQ measurements can be based on broadcast/multicast DL RS transmitted in the DL BWP configured with paging CSS sets and QCL'ed with paging PDCCH for idle/inactive UE (CD-SSB, NCD-SSB, or other DL RS). According to a second option, RSRP/RSRQ measurements can be based on SSB QCL'ed with paging PDCCH (CD-SSB or NCD-SSB). According to a third option, RSRP/RSRQ measurements can be based on SSB used for RO selection (CD-SSB or NCD-SSB). According to a fourth option, RSRP/RSRQ measurements can be based on SSB used for RO selection and QCL'ed with paging PDCCH (CD-SSB and/or NCD-SSB). According to a fifth option, RSRP/RSRQ measurements can be based on a single RS type (e.g. CD-SSB only).

When RSRP/RSRQ measurements are made in more than one DL BWP or based on more than one RS type, various parameters may be configured by the network and indicated to a RedCap UE in SI. Such parameters may include, for example, cell-specific filtering/weighting/combining parameters for multiple measurement identities, offsets applicable to RedCap (e.g., parameters Qrxlevminoffset_RedCap, Qqualminoffset_RedCap), compensation factors applicable to RedCap (Pcompensation_RedCap), and thresholds (Qrxlevmin_RedCap, Qqualmin_RedCap) are configured by NW and indicated to RedCap UE in SI.

Figure 14:
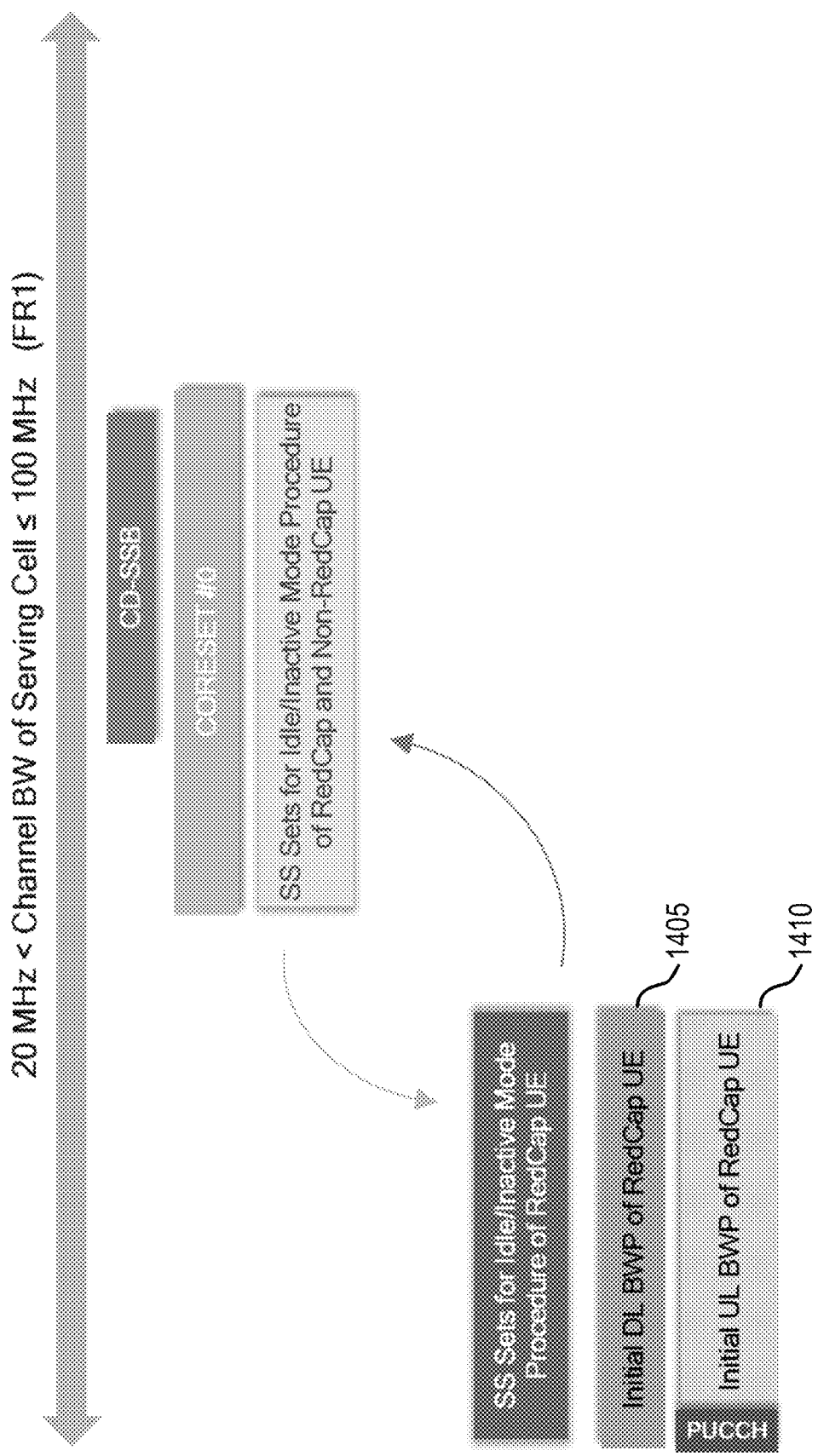
FIG. 14 and FIG. 15 depict examples of BWP switching, in accordance with aspects of the present disclosure.
Figure 15:
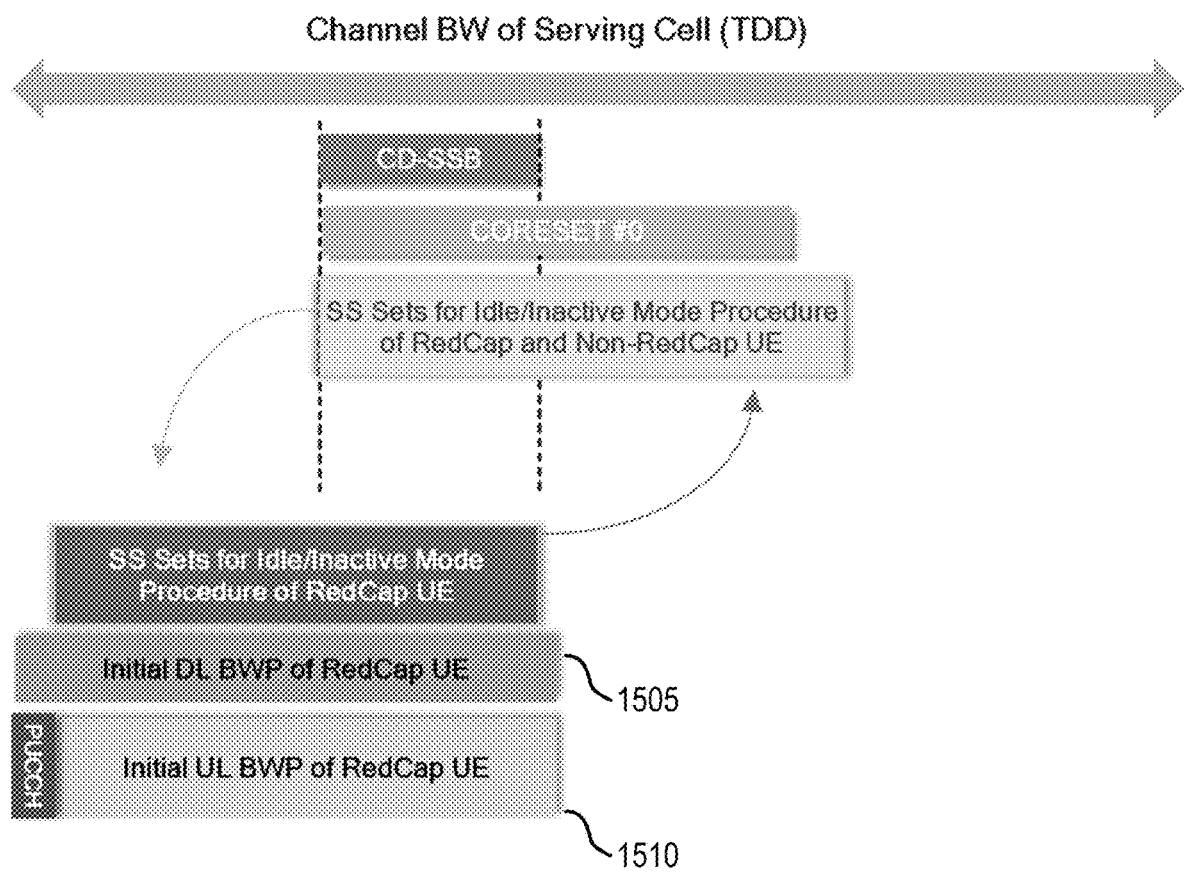

Aspects of the present disclosure also provide various options for how a RedCap UE may perform BWP switching for idle/inactive mode procedures performed on more than one DL BWP. Such options may help support procedures, such as On-demand request for SI delivery, with and without BWP switching, and On-demand PDCCH monitoring adaptation In some cases, as illustrated in FIGS. 14 and 15, after obtaining the configuration of separate initial DL/UL BWPs, a RedCap UE may switch to the RedCap-specific initial DL/UL BWP to perform idle/inactive mode procedures. Such procedures may include measurements for cell selection/re-selection, random access (ra-SearchSpace-RedCap), paging (pagingSearchSpace-RedCap), or requesting for on-demand SI (based on msg1/msg3/msgA/CG-PUSCH/PUCCH/SRS).

Figure 16:
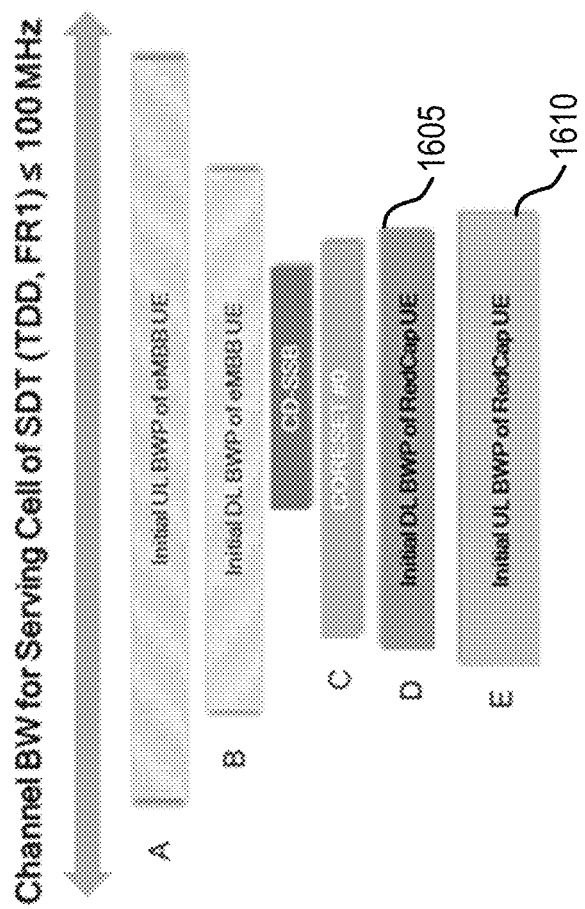
FIG. 16 depicts an example of bandwidth allocation, in accordance with aspects of the present disclosure.

Such procedures may also include mobile originated (MO) small data transmission (SDT), or mobile terminated (MT) SDT, processing multicast/broadcast signaling, or positioning. FIG. 16 illustrate an example of a DL BWP configuration that may support SDT in an initial BWP. This configuration may be suitable, for example, for an eMBB RedCap UE.

In some cases, during each DRX cycle, an idle RedCap UE may monitor a paging occasion (PO) associated with a paging SS (pagingSearchSpace-RedCap) to receive RAN/CN initiated paging. In such cases, the RedCap UE has various options for what action to take upon receiving a notification for an SI change applicable to the RedCap UE.

For example, according to a first option, the RedCap UE may perform BWP switching to a BWP containing CORESET #0 to retrieve SI update/PWS, and switch back to RedCap-specific initial DL BWP after re-acquiring the SI update. This option may be applied, for example, for DL BWP configurations shown in FIGS. 14 and 15.

According to a second option, the RedCap UE may not need to perform BWP switching and may initiate a RACH and request for "on-demand broadcast/multicast of updated SI" within the RedCap-specific initial DL BWP.

Aspects of the present disclosure also provide various options for enhanced PDCCH monitoring. For example, PDCCH monitoring adaptation may be configured for a UE based on UE capability and UE assistance information (UAI).

As used herein, PDCCH monitoring adaptation generally refers to adapting (changing) one or more PDCCH monitoring related parameters, for example, to achieve a desired purpose. For example, to achieve power savings, PDCCH monitoring parameters could be updated so a RedCap UE is monitoring less often for PDCCH transmissions. PDCCH monitoring adaptation may include, for example, updating one or more of a PDCCH monitoring periodicity, time offset of a PDCCH monitoring window, duration of the PDCCH monitoring window, time offset of a PDCCH monitoring skipping window, or a duration of the PDCCH monitoring skipping window. In some cases, a UE may be configured for PDCCH monitoring adaptation (e.g., with different sets of parameters). In such cases, PDCCH monitoring may be activated via network signaling or automatically based on one or more conditions (e.g., if the UE switches from one BWP to another). In some cases, the network may adjust transmitting PDCCH based on a UE PDCCH monitoring adaptation. In other words, the network may send PDCCH at times the UE is monitoring for PDCCH transmissions.

In some cases, a UE may transmit a request for PDCCH monitoring adaptation when performing idle mode or inactive mode procedures in one or more of a first DL BWP or a second DL BWP. In some cases, the request for PDCCH monitoring adaptation may be multiplexed with an UL transmission associated with a random access procedure (4-step RA or 2-step RA), measurements reporting, MO-SDT or MT-SDT.

In some cases, a UE may transmit UAI for PDCCH monitoring adaptation when performing idle mode or inactive mode procedures in the first and/or second DL BWP. The UAI can be multiplexed with UL transmission associated with random access procedure (4-step or 2-step RA), measurements reporting, MO-SDT or MT-SDT After transmitting the request or UAI, the UE may monitor for an indication for PDCCH monitoring adaptation. In some cases, the indication for PDCCH monitoring adaptation can be transmitted in DCI, a MAC CE or an RRC message.

During each discontinuous reception (DRX) cycle, the UE may monitor for an indication for PDCCH monitoring adaptation when performing one or more idle mode or inactive mode procedures on the first DL BWP or the second DL BWP After receiving the indication of PDCCH monitoring adaptation, the UE may update the PDCCH monitoring accordingly. For example, the UE may update one or more of PDCCH monitoring periodicity, a time offset and duration of PDCCH monitoring window, a time offset and duration of PDCCH monitoring skipping window, search space set configurations, or CORESET configuration, based on receiving the indication for PDCCH monitoring adaptation.

Example Operations of a User Equipment

Figure 17:
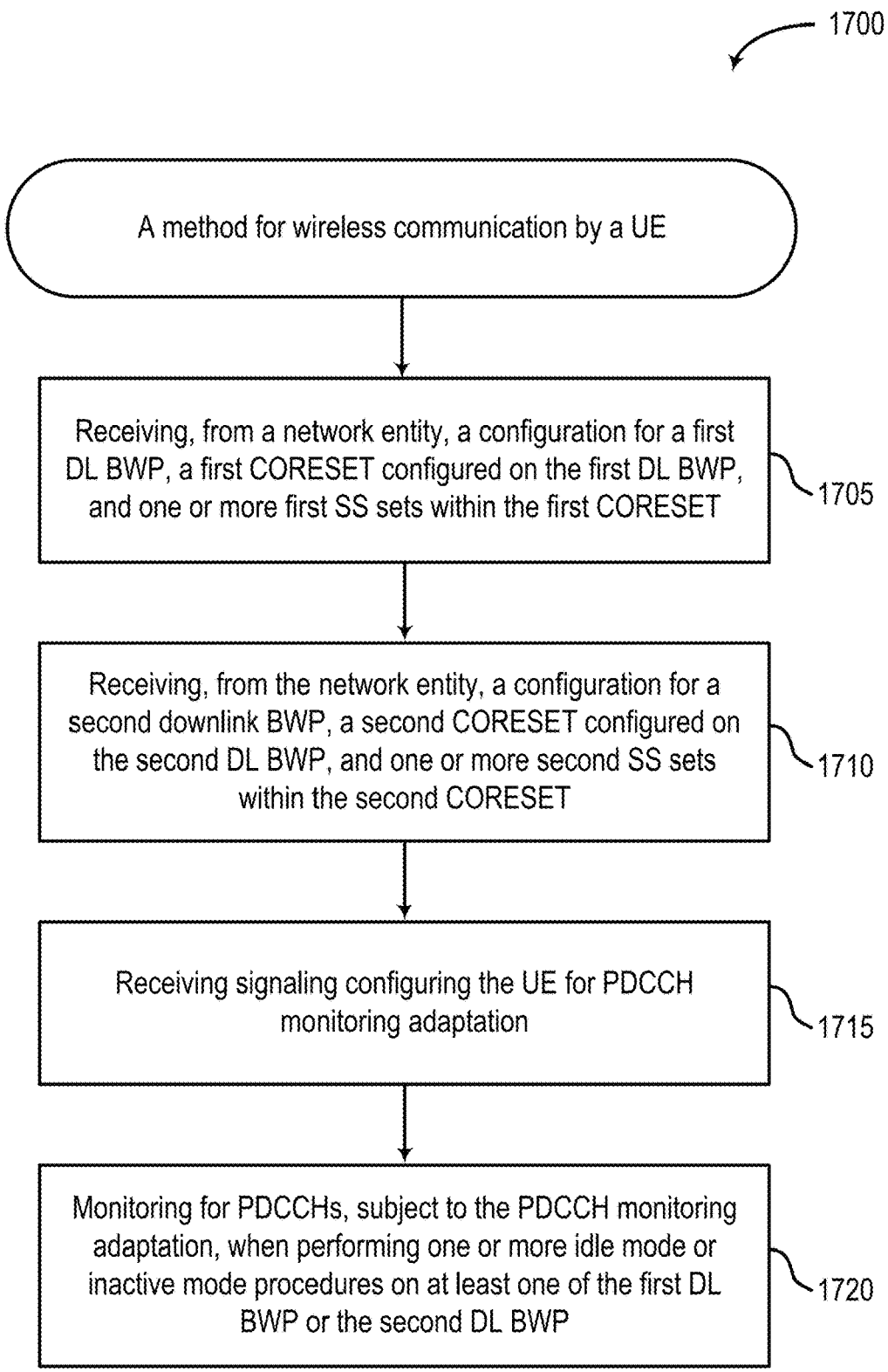
FIG. 17 depicts a method for wireless communication.

FIG. 17 shows a method 1700 for wireless communication by a UE, such as UE 104 of FIGS. 1 and 3.

Method 1700 begins at 1705 with receiving, from a network entity, a configuration for a first DL BWP, a first CORESET configured on the first DL BWP, and one or more first SS sets within the first CORESET. In some cases, the operations of this step refer to, or may be performed by, resource configuration circuitry as described with reference to FIG. 19.

Method 1700 then proceeds to step 1710 with receiving, from the network entity, a configuration for a second downlink BWP, a second CORESET configured on the second DL BWP, and one or more second SS sets within the second CORESET. In some cases, the operations of this step refer to, or may be performed by, resource configuration circuitry as described with reference to FIG. 19.

Method 1700 then proceeds to step 1715 with receiving signaling configuring the UE for PDCCH monitoring adaptation. In some cases, the operations of this step refer to, or may be performed by, PDCCH monitoring adaptation circuitry as described with reference to FIG. 19.

Method 1700 then proceeds to step 1720 with monitoring for PDCCHs, subject to the PDCCH monitoring adaptation, when performing one or more idle mode or inactive mode procedures on at least one of the first DL BWP or the second DL BWP. In some cases, the operations of this step refer to, or may be performed by, PDCCH monitoring circuitry as described with reference to FIG. 19.

Various aspects relate to the method 1700, including the following aspects.

In some aspects, method 1700 further includes monitoring, during DRX cycles, for an indication of PDCCH monitoring adaptation when performing one or more idle mode or inactive mode procedures on at least one of the first DL BWP or the second DL BWP.

In some aspects, method 1700 further includes receiving, as a result of the monitoring, signaling indicating PDCCH monitoring adaptation on at least one of the first DL BWP or the second DL BWP. In some aspects, the signaling indicating PDCCH monitoring adaptation is received via at least one of DCI, MAC-CE, RRC signaling, or a combination thereof.

In some aspects, method 1700 further includes updating, based on the signaling, at least one of PDCCH monitoring periodicity, time offset of a PDCCH monitoring window, duration of the PDCCH monitoring window, time offset of a PDCCH monitoring skipping window, or a duration of the PDCCH monitoring skipping window.

In some aspects, the PDCCH monitoring adaptation is activated when the UE, while in idle or inactive mode, switches from the first DL BWP to the second DL BWP or switches from the second DL BWP to the first DL BWP.

In some aspects, a total number of PDCCH decoding or channel estimation attempts of the UE within a pre-configured time span on the first DL BWP and the second DL BWP is limited by a pre-configured bound, wherein a configuration of at least one of the time span or the bound depends on at least one of a UE capability, a configuration of the first DL BWP, a configuration of the second DL BWP, a configuration of the power saving, or a configuration of coverage enhancement.

In some aspects, method 1700 further includes updating, based on the signaling, at least one of SS sets or a CORESET configuration for PDCCH monitoring on at least one of the first DL BWP or the second DL BWP.

In some aspects, the PDCCH monitoring adaptation is configured for the UE based on at least one of: a UE capability indication or UAI transmitted by the UE in an UL BWP linked to at least one of the first DL BWP or the second DL BWP.

In some aspects, method 1700 further includes transmitting at least one of a request or UAI for PDCCH monitoring adaptation when performing idle mode or inactive mode procedures in at least one of the first DL BWP or the second DL BWP.

In some aspects, transmitting the request or UAI comprises multiplexing the request or UAI with an UL transmission associated with at least one of a random access procedure, measurement reporting, mobile originated data transfer, or mobile terminated data transfer.

Figure 19:
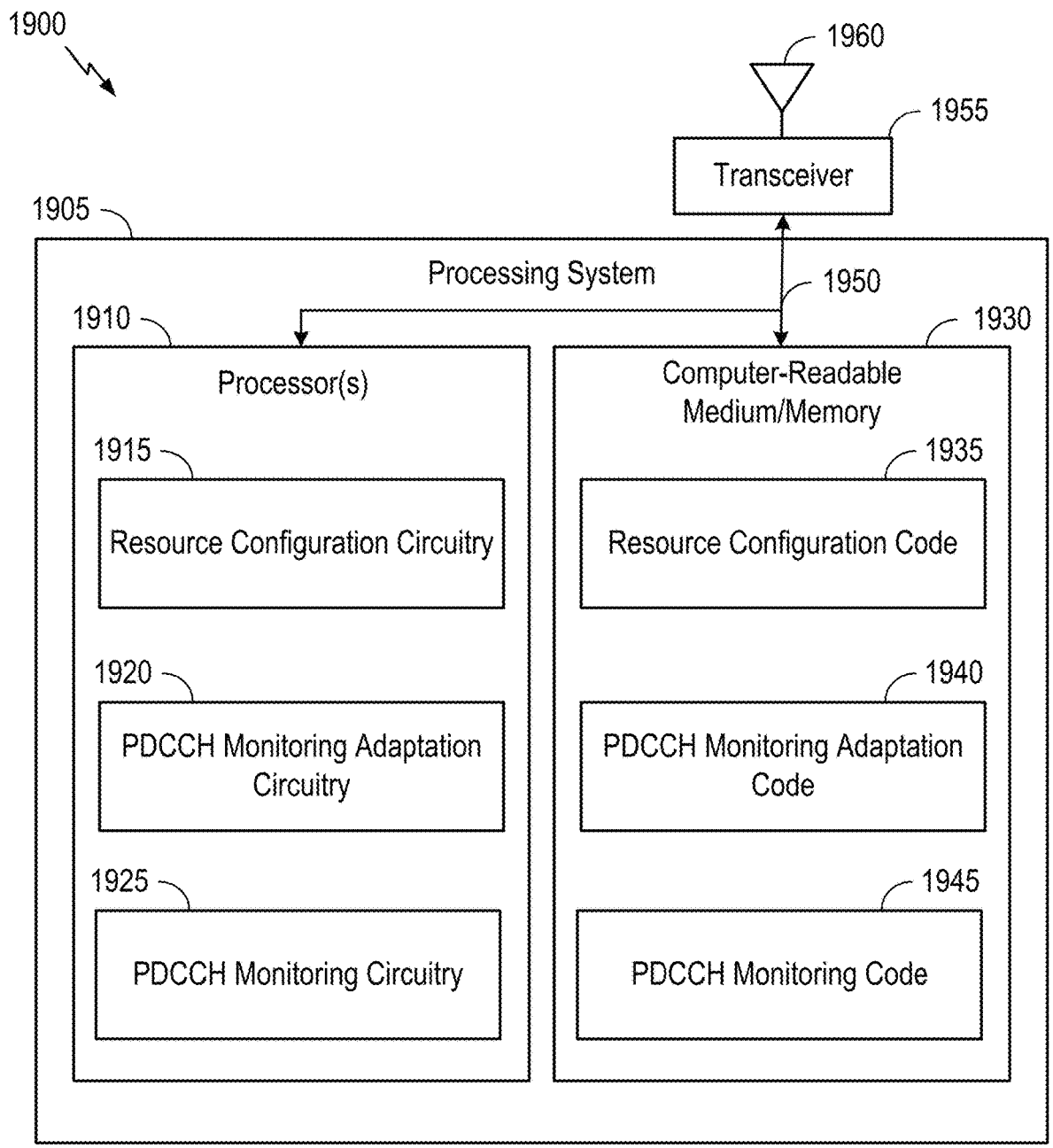
FIG. 19 depicts aspects of an example communications device.

In one aspect, method 1700, or any aspect related to it, may be performed by an apparatus, such as communications device 1900 of FIG. 19, which includes various components operable, configured, or adapted to perform the method 1700. Communications device 1900 is described below in further detail.

Note that FIG. 17 is just one example of a method, and other methods including fewer, additional, or alternative steps are possible consistent with this disclosure.

Example Operations of a Network Entity

Figure 18:
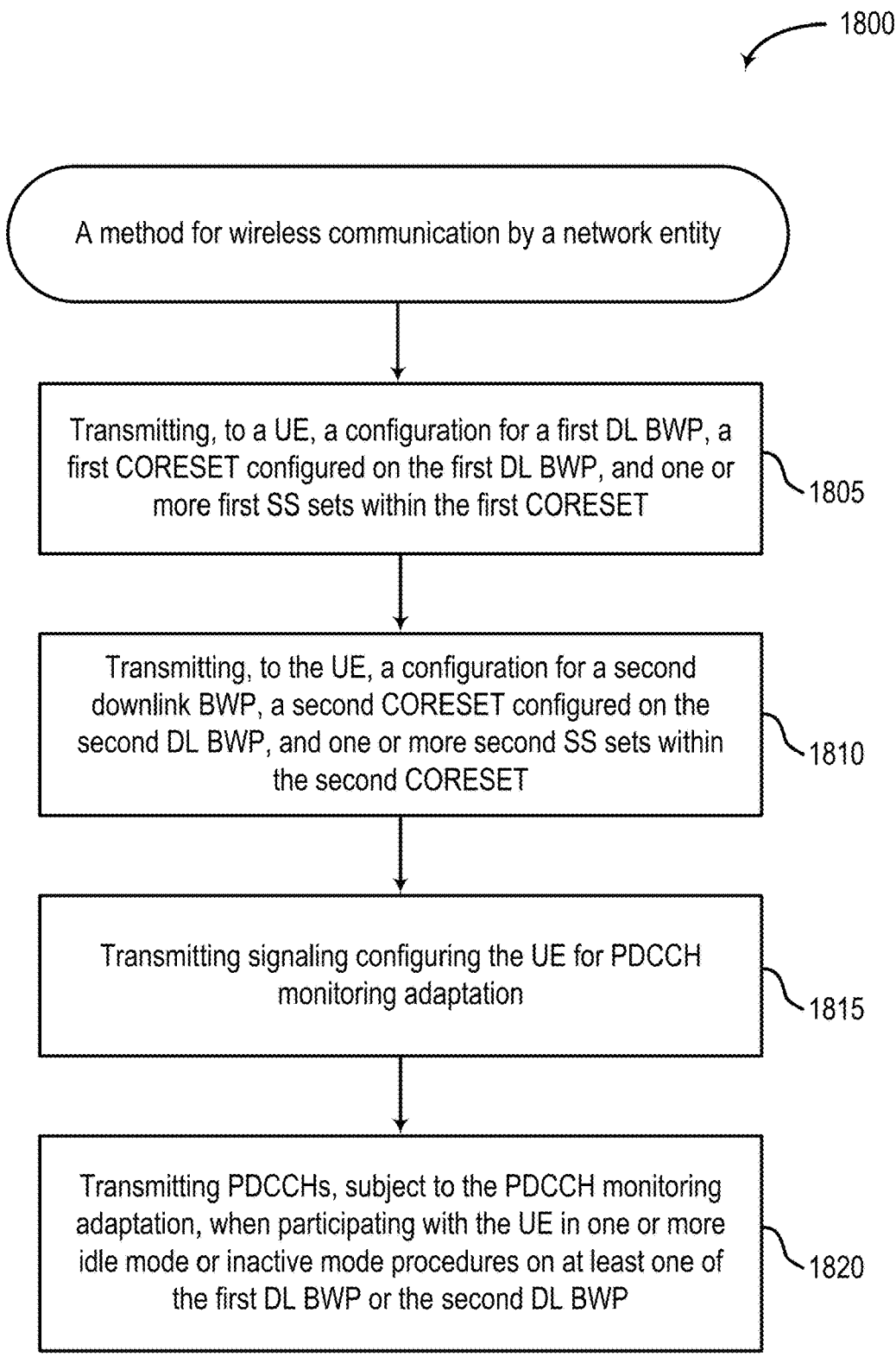
FIG. 18 depicts a method for wireless communication.

FIG. 18 shows an example of 1800 for wireless communications according to aspects of the present disclosure. In some aspects, a user equipment, such as UE 104 of FIGS. 1 and 3, or processing system 1905 of FIG. 19, may perform the method 1700. In some aspects, a base station, such as BS 102 of FIGS. 1 and 3, or processing system 2005 of FIG. 20, may perform the method 1800.

FIG. 18 shows a method 1800 for wireless communication by a network entity, such as BS 102 of FIGS. 1 and 3, or a disaggregated base station as discussed with respect to FIG. 2.

Method 1800 begins at 1805 with transmitting, to a UE, a configuration for a first DL BWP, a first CORESET configured on the first DL BWP, and one or more first SS sets within the first CORESET. In some cases, the operations of this step refer to, or may be performed by, UE configuration circuitry as described with reference to FIG. 20.

Method 1800 then proceeds to step 1810 with transmitting, to the UE, a configuration for a second downlink BWP, a second CORESET configured on the second DL BWP, and one or more second SS sets within the second CORESET. In some cases, the operations of this step refer to, or may be performed by, UE configuration circuitry as described with reference to FIG. 20.

Method 1800 then proceeds to step 1815 with transmitting signaling configuring the UE for PDCCH monitoring adaptation. In some cases, the operations of this step refer to, or may be performed by, PDCCH monitoring adaptation configuration circuitry as described with reference to FIG. 20.

Method 1800 then proceeds to step 1820 with transmitting PDCCHs, subject to the PDCCH monitoring adaptation, when participating with the UE in one or more idle mode or inactive mode procedures on at least one of the first DL BWP or the second DL BWP. In some cases, the operations of this step refer to, or may be performed by, PDCCH transmission circuitry as described with reference to FIG. 20.

Various aspects relate to the method 1800, including the following aspects.

In some aspects, method 1800 further includes transmitting, during DRX cycles, signaling indicating PDCCH monitoring adaptation when performing one or more idle mode or inactive mode procedures on at least one of the first DL BWP or the second DL BWP. In some aspects, the signaling indicating PDCCH monitoring adaptation is transmitted via at least one of DCI, MAC-CE, RRC signaling, or a combination thereof.

In some aspects, the PDCCH monitoring adaptation is activated when the UE, while in idle or inactive mode, switches from the first DL BWP to the second DL BWP or switches from the second DL BWP to the first DL BWP.

In some aspects, a total number of PDCCH decoding or channel estimation attempts of the UE within a pre-configured time span on the first DL BWP and the second DL BWP is limited by a pre-configured bound, wherein a configuration of at least one of the time span or the bound depends on at least one of a UE capability, a configuration of the first DL BWP, a configuration of the second DL BWP, a configuration of the power saving, or a configuration of coverage enhancement.

In some aspects, method 1800 further includes updating, based on the signaling, at least one of SS sets or a CORESET configuration for transmitting PDCCH on at least one of the first DL BWP or the second DL BWP.

In some aspects, the PDCCH monitoring adaptation is configured for the UE based on at least one of: a UE capability indication or UAI received from the UE in an UL BWP linked to at least one of the first DL BWP or the second DL BWP.

In some aspects, method 1800 further includes receiving, from the UE, at least one of a request or UAI for PDCCH monitoring adaptation when the UE is performing idle mode or inactive mode procedures in at least one of the first DL BWP or the second DL BWP. In some aspects, the request or UAI is multiplexing with an UL transmission associated with at least one of a random access procedure, measurement reporting, mobile originated data transfer, or mobile terminated data transfer.

Figure 20:
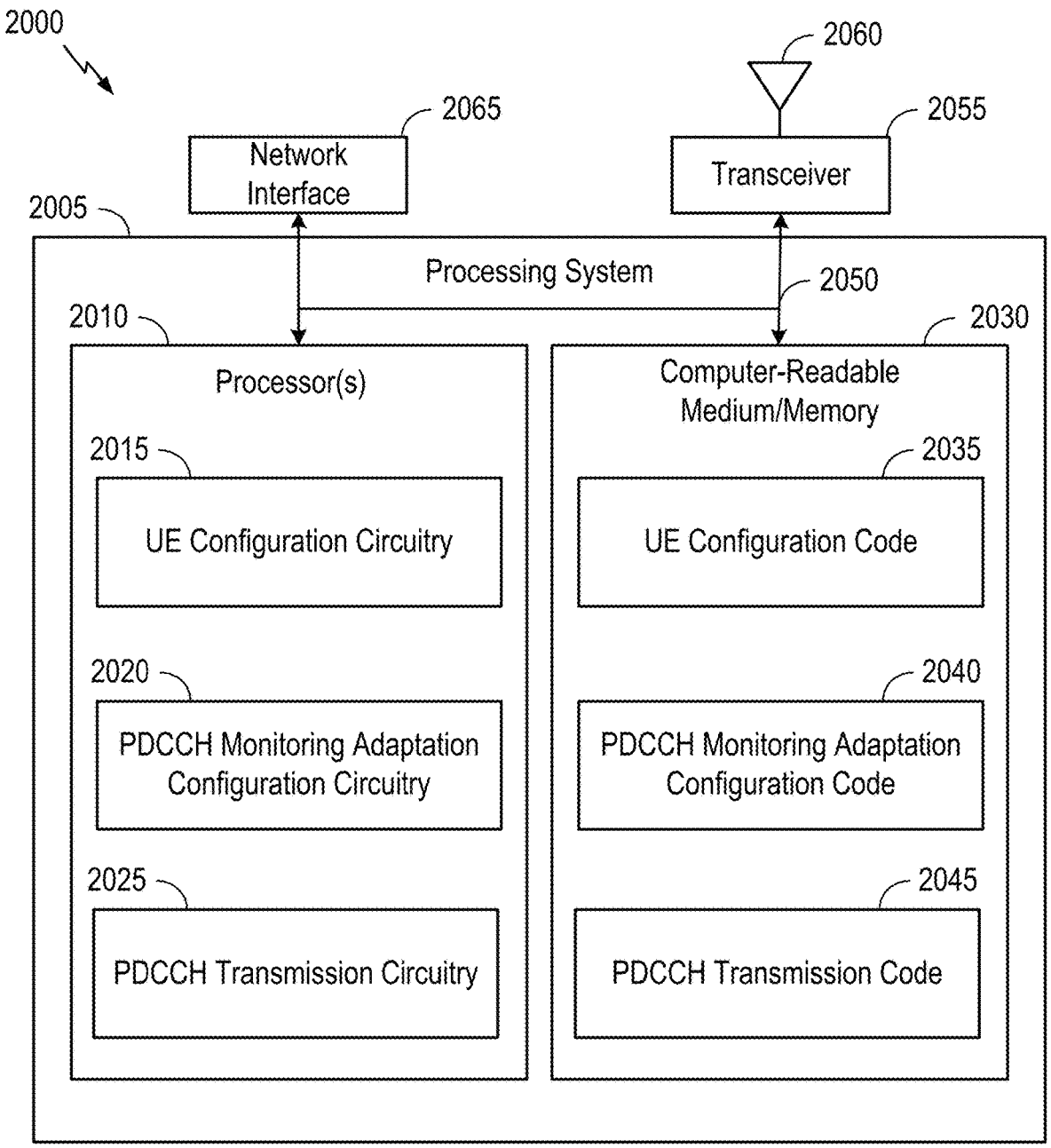
FIG. 20 depicts aspects of an example communications device.

In one aspect, method 1800, or any aspect related to it, may be performed by an apparatus, such as communications device 2000 of FIG. 20, which includes various components operable, configured, or adapted to perform the method 1800. Communications device 2000 is described below in further detail.

Note that FIG. 18 is just one example of a method, and other methods including fewer, additional, or alternative steps are possible consistent with this disclosure.

Example Communications Devices

FIG. 19 depicts aspects of an example communications device 1900. In some aspects, communications device 1900 is a user equipment, such as UE 104 described above with respect to FIGS. 1 and 3.

The communications device 1900 includes a processing system 1905 coupled to the transceiver 1955 (e.g., a transmitter and/or a receiver). The transceiver 1955 is configured to transmit and receive signals for the communications device 1900 via the antenna 1960, such as the various signals as described herein. The processing system 1905 may be configured to perform processing functions for the communications device 1900, including processing signals received and/or to be transmitted by the communications device 1900.

The processing system 1905 includes one or more processors 1910. In various aspects, the one or more processors 1910 may be representative of one or more of receive processor 358, transmit processor 364, TX MIMO processor 366, and/or controller/processor 380, as described with respect to FIG. 3. The one or more processors 1910 are coupled to a computer-readable medium/memory 1930 via a bus 1950. In certain aspects, the computer-readable medium/memory 1930 is configured to store instructions (e.g., computer-executable code) that when executed by the one or more processors 1910, cause the one or more processors 1910 to perform the method 1700 described with respect to FIG. 17, or any aspect related to it. Note that reference to a processor performing a function of communications device 1900 may include one or more processors 1910 performing that function of communications device 1900.

In the depicted example, computer-readable medium/memory 1930 stores code (e.g., executable instructions), such as resource configuration code 1935, PDCCH monitoring adaptation code 1940, and PDCCH monitoring code 1945. Processing of the resource configuration code 1935, PDCCH monitoring adaptation code 1940, and PDCCH monitoring code 1945 may cause the communications device 1900 to perform the method 1700 described with respect to FIG. 17, or any aspect related to it.

The one or more processors 1910 include circuitry configured to implement (e.g., execute) the code stored in the computer-readable medium/memory 1930, including circuitry such as resource configuration circuitry 1915, PDCCH monitoring adaptation circuitry 1920, and PDCCH monitoring circuitry 1925. Processing with resource configuration circuitry 1915, PDCCH monitoring adaptation circuitry 1920, and PDCCH monitoring circuitry 1925 may cause the communications device 1900 to perform the method 1700 described with respect to FIG. 17, or any aspect related to it.

Various components of the communications device 1900 may provide means for performing the method 1700 described with respect to FIG. 17, or any aspect related to it. For example, means for transmitting, sending or outputting for transmission may include transceivers 354 and/or antenna(s) 352 of the UE 104 illustrated in FIG. 3 and/or the transceiver 1955 and the antenna 1960 of the communications device 1900 in FIG. 19. Means for receiving or obtaining may include transceivers 354 and/or antenna(s) 352 of the UE 104 illustrated in FIG. 3 and/or the transceiver 1955 and the antenna 1960 of the communications device 1900 in FIG. 19.

According to some aspects, resource configuration circuitry 1915 receives, from a network entity, a configuration for a first DL BWP, a first CORESET configured on the first DL BWP, and one or more first SS sets within the first CORESET. In some examples, resource configuration circuitry 1915 receives, from the network entity, a configuration for a second downlink BWP, a second CORESET configured on the second DL BWP, and one or more second SS sets within the second CORESET.

According to some aspects, PDCCH monitoring adaptation circuitry 1920 receives signaling configuring the UE for PDCCH monitoring adaptation. According to some aspects, PDCCH monitoring circuitry 1925 monitors for PDCCHs, subject to the PDCCH monitoring adaptation, when performing one or more idle mode or inactive mode procedures on at least one of the first DL BWP or the second DL BWP.

In some examples, PDCCH monitoring adaptation circuitry 1920 monitors, during DRX cycles, for an indication of PDCCH monitoring adaptation when performing one or more idle mode or inactive mode procedures on at least one of the first DL BWP or the second DL BWP. In some examples, PDCCH monitoring adaptation circuitry 1920 receives, as a result of the monitoring, signaling indicating PDCCH monitoring adaptation on at least one of the first DL BWP or the second DL BWP. In some aspects, the signaling indicating PDCCH monitoring adaptation is received via at least one of DCI, MAC-CE, RRC signaling, or a combination thereof. In some examples, PDCCH monitoring adaptation circuitry 1920 updates, based on the signaling, at least one of PDCCH monitoring periodicity, time offset of a PDCCH monitoring window, duration of the PDCCH monitoring window, time offset of a PDCCH monitoring skipping window, or a duration of the PDCCH monitoring skipping window. In some aspects, the PDCCH monitoring adaptation is activated when the UE, while in idle or inactive mode, switches from the first DL BWP to the second DL BWP or switches from the second DL BWP to the first DL BWP.

In some aspects, a total number of PDCCH decoding or channel estimation attempts of the UE within a pre-configured time span on the first DL BWP and the second DL BWP is limited by a pre-configured bound, where a configuration of at least one of the time span or the bound depends on at least one of a UE capability, a configuration of the first DL BWP, a configuration of the second DL BWP, a configuration of the power saving, or a configuration of coverage enhancement. In some examples, resource configuration circuitry 1915 updates, based on the signaling, at least one of SS sets or a CORESET configuration for PDCCH monitoring on at least one of the first DL BWP or the second DL BWP.

In some aspects, the PDCCH monitoring adaptation is configured for the UE based on at least one of: a UE capability indication or UAI transmitted by the UE in an UL BWP linked to at least one of the first DL BWP or the second DL BWP. In some examples, PDCCH monitoring adaptation circuitry 1920 transmits at least one of a request or UAI for PDCCH monitoring adaptation when performing idle mode or inactive mode procedures in at least one of the first DL BWP or the second DL BWP. In some aspects, transmitting the request or UAI includes multiplexing the request or UAI with an UL transmission associated with at least one of a random access procedure, measurement reporting, mobile originated data transfer, or mobile terminated data transfer.

FIG. 20 depicts aspects of an example communications device 2000. In some aspects, communications device 2000 is a network entity, such as BS 102 described above with respect to FIGS. 1 and 3.

The communications device 2000 includes a processing system 2005 coupled to the transceiver 2055 (e.g., a transmitter and/or a receiver) and/or a network interface 2065. The transceiver 2055 is configured to transmit and receive signals for the communications device 2000 via the antenna 2060, such as the various signals as described herein. The network interface 2065 is configured to obtain and send signals for the communications device 2000 via communication link(s), such as a backhaul link, midhaul link, and/or fronthaul link as described herein, such as with respect to FIG. 2. The processing system 2005 may be configured to perform processing functions for the communications device 2000, including processing signals received and/or to be transmitted by the communications device 2000.

The processing system 2005 includes one or more processors 2010. In various aspects, one or more processors 2010 may be representative of one or more of receive processor 338, transmit processor 320, TX MIMO processor 330, and/or controller/processor 340, as described with respect to FIG. 3. The one or more processors 2010 are coupled to a computer-readable medium/memory 2030 via a bus 2050. In certain aspects, the computer-readable medium/memory 2030 is configured to store instructions (e.g., computer-executable code) that when executed by the one or more processors 2010, cause the one or more processors 2010 to perform the method 1800 described with respect to FIG. 18, or any aspect related to it. Note that reference to a processor of communications device 2000 performing a function may include one or more processors 2010 of communications device 2000 performing that function.

In the depicted example, the computer-readable medium/memory 2030 stores code (e.g., executable instructions), such as UE configuration code 2035, PDCCH monitoring adaptation configuration code 2040, and PDCCH transmission code 2045. Processing of the UE configuration code 2035, PDCCH monitoring adaptation configuration code 2040, and PDCCH transmission code 2045 may cause the communications device 2000 to perform the method 1800 described with respect to FIG. 18, or any aspect related to it.

The one or more processors 2010 include circuitry configured to implement (e.g., execute) the code stored in the computer-readable medium/memory 2030, including circuitry such as UE configuration circuitry 2015, PDCCH monitoring adaptation configuration circuitry 2020, and PDCCH transmission circuitry 2025. Processing with UE configuration circuitry 2015, PDCCH monitoring adaptation configuration circuitry 2020, and PDCCH transmission circuitry 2025 may cause the communications device 2000 to perform the method 1800 as described with respect to FIG. 18, or any aspect related to it.

Various components of the communications device 2000 may provide means for performing the method 1800 as described with respect to FIG. 18, or any aspect related to it. Means for transmitting, sending or outputting for transmission may include transceivers 332 and/or antenna(s) 334 of the BS 102 illustrated in FIG. 3 and/or the transceiver 2055 and the antenna 2060 of the communications device 2000 in FIG. 20. Means for receiving or obtaining may include transceivers 332 and/or antenna(s) 334 of the BS 102 illustrated in FIG. 3 and/or the transceiver 2055 and the antenna 2060 of the communications device 2000 in FIG. 20.

According to some aspects, UE configuration circuitry 2015 transmits, to a UE, a configuration for a first DL BWP, a first CORESET configured on the first DL BWP, and one or more first SS sets within the first CORESET. In some examples, UE configuration circuitry 2015 transmits, to the UE, a configuration for a second downlink BWP, a second CORESET configured on the second DL BWP, and one or more second SS sets within the second CORESET. According to some aspects, PDCCH monitoring adaptation configuration circuitry 2020 transmits signaling configuring the UE for PDCCH monitoring adaptation. According to some aspects, PDCCH transmission circuitry 2025 transmits PDCCHs, subject to the PDCCH monitoring adaptation, when participating with the UE in one or more idle mode or inactive mode procedures on at least one of the first DL BWP or the second DL BWP.

In some examples, PDCCH monitoring adaptation configuration circuitry 2020 transmits, during DRX cycles, signaling indicating PDCCH monitoring adaptation when performing one or more idle mode or inactive mode procedures on at least one of the first DL BWP or the second DL BWP. In some aspects, the signaling indicating PDCCH monitoring adaptation is transmitted via at least one of DCI, MAC-CE, RRC signaling, or a combination thereof. In some aspects, the PDCCH monitoring adaptation is activated when the UE, while in idle or inactive mode, switches from the first DL BWP to the second DL BWP or switches from the second DL BWP to the first DL BWP.

In some aspects, a total number of PDCCH decoding or channel estimation attempts of the UE within a pre-configured time span on the first DL BWP and the second DL BWP is limited by a pre-configured bound, where a configuration of at least one of the time span or the bound depends on at least one of a UE capability, a configuration of the first DL BWP, a configuration of the second DL BWP, a configuration of the power saving, or a configuration of coverage enhancement. In some examples, UE configuration circuitry 2015 updates, based on the signaling, at least one of SS sets or a CORESET configuration for transmitting PDCCH on at least one of the first DL BWP or the second DL BWP. In some aspects, the PDCCH monitoring adaptation is configured for the UE based on at least one of: a UE capability indication or UAI received from the UE in an UL BWP linked to at least one of the first DL BWP or the second DL BWP. In some examples, PDCCH monitoring adaptation configuration circuitry 2020 receives, from the UE, at least one of a request or UAI for PDCCH monitoring adaptation when the UE is performing idle mode or inactive mode procedures in at least one of the first DL BWP or the second DL BWP. In some aspects, the request or UAI is multiplexing with an UL transmission associated with at least one of a random access procedure, measurement reporting, mobile originated data transfer, or mobile terminated data transfer.

EXAMPLE CLAUSES

Implementation examples are described in the following numbered clauses:

Clause 1: A method for wireless communication by a UE, comprising: receiving, from a network entity, a configuration for a first DL BWP, a first CORESET configured on the first DL BWP, and one or more first SS sets within the first CORESET; receiving, from the network entity, a configuration for a second downlink BWP, a second CORESET configured on the second DL BWP, and one or more second SS sets within the second CORESET; receiving signaling configuring the UE for PDCCH monitoring adaptation; and monitoring for PDCCHs, subject to the PDCCH monitoring adaptation, when performing one or more idle mode or inactive mode procedures on at least one of the first DL BWP or the second DL BWP.

Clause 2: The method of Clause 1, further comprising: monitoring, during DRX cycles, for an indication of PDCCH monitoring adaptation when performing one or more idle mode or inactive mode procedures on at least one of the first DL BWP or the second DL BWP.

Clause 3: The method of any one of Clauses 1 and 2, further comprising: receiving, as a result of the monitoring, signaling indicating PDCCH monitoring adaptation on at least one of the first DL BWP or the second DL BWP.

Clause 4: The method of Clause 3, wherein the signaling indicating PDCCH monitoring adaptation is received via at least one of DCI, MAC-CE, RRC signaling, or a combination thereof.

Clause 5: The method of Clause 3, further comprising: updating, based on the signaling, at least one of PDCCH monitoring periodicity, time offset of a PDCCH monitoring window, duration of the PDCCH monitoring window, time offset of a PDCCH monitoring skipping window, or a duration of the PDCCH monitoring skipping window.

Clause 6: The method of any one of Clauses 1-5, wherein the PDCCH monitoring adaptation is activated when the UE, while in idle or inactive mode, switches from the first DL BWP to the second DL BWP or switches from the second DL BWP to the first DL BWP.

Clause 7: The method of any one of Clauses 1-6, wherein a total number of PDCCH decoding or channel estimation attempts of the UE within a pre-configured time span on the first DL BWP and the second DL BWP is limited by a pre-configured bound, wherein a configuration of at least one of the time span or the bound depends on at least one of a UE capability, a configuration of the first DL BWP, a configuration of the second DL BWP, a configuration of the power saving, or a configuration of coverage enhancement.

Clause 8: The method of any one of Clauses 1-7, further comprising: updating, based on the signaling, at least one of SS sets or a CORESET configuration for PDCCH monitoring on at least one of the first DL BWP or the second DL BWP.

Clause 9: The method of any one of Clauses 1-8, wherein the PDCCH monitoring adaptation is configured for the UE based on at least one of: a UE capability indication or UAI transmitted by the UE in an UL BWP linked to at least one of the first DL BWP or the second DL BWP.

Clause 10: The method of any one of Clauses 1-9, further comprising: transmitting at least one of a request or UAI for PDCCH monitoring adaptation when performing idle mode or inactive mode procedures in at least one of the first DL BWP or the second DL BWP.

Clause 11: The method of Clause 10, wherein transmitting the request or UAI comprises multiplexing the request or UAI with an UL transmission associated with at least one of a random access procedure, measurement reporting, mobile originated data transfer, or mobile terminated data transfer.

Clause 12: A method for wireless communication by a network entity, comprising: transmitting, to a UE, a configuration for a first DL BWP, a first CORESET configured on the first DL BWP, and one or more first SS sets within the first CORESET; transmitting, to the UE, a configuration for a second downlink BWP, a second CORESET configured on the second DL BWP, and one or more second SS sets within the second CORESET; transmitting signaling configuring the UE for PDCCH monitoring adaptation; and transmitting PDCCHs, subject to the PDCCH monitoring adaptation, when participating with the UE in one or more idle mode or inactive mode procedures on at least one of the first DL BWP or the second DL BWP.

Clause 13: The method of Clause 12, further comprising: transmitting, during DRX cycles, signaling indicating PDCCH monitoring adaptation when performing one or more idle mode or inactive mode procedures on at least one of the first DL BWP or the second DL BWP.

Clause 14: The method of Clause 13, wherein the signaling indicating PDCCH monitoring adaptation is transmitted via at least one of DCI, MAC-CE, RRC signaling, or a combination thereof.

Clause 15: The method of any one of Clauses 12-14, wherein the PDCCH monitoring adaptation is activated when the UE, while in idle or inactive mode, switches from the first DL BWP to the second DL BWP or switches from the second DL BWP to the first DL BWP.

Clause 16: The method of any one of Clauses 12-15, wherein a total number of PDCCH decoding or channel estimation attempts of the UE within a pre-configured time span on the first DL BWP and the second DL BWP is limited by a pre-configured bound, wherein a configuration of at least one of the time span or the bound depends on at least one of a UE capability, a configuration of the first DL BWP, a configuration of the second DL BWP, a configuration of the power saving, or a configuration of coverage enhancement.

Clause 17: The method of any one of Clauses 12-16, further comprising: updating, based on the signaling, at least one of SS sets or a CORESET configuration for transmitting PDCCH on at least one of the first DL BWP or the second DL BWP.

Clause 18: The method of any one of Clauses 12-17, wherein the PDCCH monitoring adaptation is configured for the UE based on at least one of: a UE capability indication or UAI received from the UE in an UL BWP linked to at least one of the first DL BWP or the second DL BWP.

Clause 19: The method of any one of Clauses 12-18, further comprising: receiving, from the UE, at least one of a request or UAI for PDCCH monitoring adaptation when the UE is performing idle mode or inactive mode procedures in at least one of the first DL BWP or the second DL BWP.

Clause 20: The method of Clause 19, wherein the request or UAI is multiplexing with an UL transmission associated with at least one of a random access procedure, measurement reporting, mobile originated data transfer, or mobile terminated data transfer.

Clause 21: A processing system, comprising: a memory comprising computer-executable instructions; one or more processors configured to execute the computer-executable instructions and cause the processing system to perform a method in accordance with any one of Clauses 1-20.

Clause 22: A processing system, comprising means for performing a method in accordance with any one of Clauses 1-20.

Clause 23: A non-transitory computer-readable medium comprising computer-executable instructions that, when executed by one or more processors of a processing system, cause the processing system to perform a method in accordance with any one of Clauses 1-20.

Clause 24: A computer program product embodied on a computer-readable storage medium comprising code for performing a method in accordance with any one of Clauses 1-20.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication at a user equipment (UE), comprising:
    memory comprising computer-executable instructions; and
    one or more processors configured to, individually or collectively, execute the computer-executable instructions and cause the apparatus to:
        receive, from a network entity, a configuration for a first downlink (DL) bandwidth part (BWP), a first control resource set (CORESET) configured on the first DL BWP, and one or more first search space (SS) sets within the first CORESET;
        receive, from the network entity, a configuration for a second downlink-DL BWP, a second CORESET configured on the second DL BWP, and one or more second SS sets within the second CORESET;
        receive signaling of a configuration for physical downlink control channel (PDCCH) monitoring adaptation;
        monitor, during discontinuous reception (DRX) cycles, for an indication of PDCCH monitoring adaptation when performing one or more idle mode or inactive mode procedures on at least one of the first DL BWP or the second DL BWP;
        receive, as a result of the monitoring, signaling activating PDCCH monitoring adaptation, on at least one of the first DL BWP or the second DL BWP, in accordance with the configuration;
        update, based on the signaling activating PDCCH monitoring adaptation, at least one of PDCCH monitoring periodicity, time offset of a PDCCH monitoring window, duration of the PDCCH monitoring window, time offset of a PDCCH monitoring skipping window, or a duration of the PDCCH monitoring skipping window; and
        monitor for PDCCHs, subject to the PDCCH monitoring adaptation, when performing one or more idle mode or inactive mode procedures on at least one of the first DL BWP or the second DL BWP.

2. The apparatus of claim 1, wherein the signaling indicating a configuration for PDCCH monitoring adaptation is received via at least one of downlink control information (DCI), medium access control (MAC) control element (CE), radio resource control (RRC) signaling, or a combination thereof.

3. The apparatus of claim 1, wherein the one or more processors are further configured to, individually or collectively, execute the computer-executable instructions and cause the apparatus to:
update, based on the signaling, at least one of SS sets or a CORESET configuration for PDCCH monitoring on at least one of the first DL BWP or the second DL BWP.

4. The apparatus of claim 1, wherein
the PDCCH monitoring adaptation is configured for the UE based on at least one of: a UE capability indication or UE assistance information (UAI) transmitted by the UE in an UL BWP linked to at least one of the first DL BWP or the second DL BWP.

5. The apparatus of claim 1, wherein the one or more processors are further configured to, individually or collectively, execute the computer-executable instructions and cause the apparatus to:
transmit at least one of a request or UE assistance information (UAI) for PDCCH monitoring adaptation when performing idle mode or inactive mode procedures in at least one of the first DL BWP or the second DL BWP.

6. The apparatus of claim 5, wherein transmitting the request or UAI comprises multiplexing the request or UAI with an UL transmission associated with at least one of a random access procedure, measurement reporting, mobile originated data transfer, or mobile terminated data transfer.

7. An apparatus for wireless communication at a network entity, comprising:
memory comprising computer-executable instructions; and one or more processors configured to, individually or collectively, execute the computer-executable instructions and cause the apparatus to:
transmit, to a user equipment (UE), a configuration for a first downlink (DL) bandwidth part (BWP), a first control resource set (CORESET) configured on the first DL BWP, and one or more first search space (SS) sets within the first CORESET;
transmit, to the UE, a configuration for a second DL BWP, a second CORESET configured on the second DL BWP, and one or more second SS sets within the second CORESET;
transmit signaling configuring the UE for physical downlink control channel (PDCCH) monitoring adaptation;
transmit, during discontinuous reception (DRX) cycles, signaling indicating PDCCH monitoring adaptation when performing one or more idle mode or inactive mode procedures on at least one of the first DL BWP or the second DL BWP;
update, based on the signaling indicating PDCCH monitoring adaptation, at least one of SS sets or a CORESET configuration for transmitting PDCCH on at least one of the first DL BWP or the second DL BWP; and
transmit PDCCHs, subject to the PDCCH monitoring adaptation, when participating with the UE in one or more idle mode or inactive mode procedures on at least one of the first DL BWP or the second DL BWP.

8. The apparatus of claim 7, wherein the signaling indicating PDCCH monitoring adaptation is transmitted via at least one of downlink control information (DCI), medium access control (MAC) control element (CE), radio resource control (RRC) signaling, or a combination thereof.

9. The apparatus of claim 7, wherein PDCCH monitoring adaptation is activated when the UE, while in idle or inactive mode, switches from the first DL BWP to the second DL BWP or switches from the second DL BWP to the first DL BWP.

10. The apparatus of claim 7, wherein a total number of PDCCH decoding or channel estimation attempts of the UE within a pre-configured time span on the first DL BWP and the second DL BWP is limited by a pre-configured bound, wherein a configuration of at least one of the time span or the bound depends on at least one of a UE capability, a configuration of the first DL BWP, a configuration of the second DL BWP, a configuration of power saving, or a configuration of coverage enhancement.

11. The apparatus of claim 7, wherein
the PDCCH monitoring adaptation is configured for the UE based on at least one of: a UE capability indication or UE assistance information (UAI) received from the UE in an UL BWP linked to at least one of the first DL BWP or the second DL BWP.

12. The apparatus of claim 7, wherein the one or more processors are further configured to, individually or collectively, execute the computer-executable instructions and cause the apparatus to:
receive, from the UE, at least one of a request or UE assistance information (UAI) for PDCCH monitoring adaptation when the UE is performing idle mode or inactive mode procedures in at least one of the first DL BWP or the second DL BWP.

13. The apparatus of claim 12, wherein the request or UAI is multiplexing with an UL transmission associated with at least one of a random access procedure, measurement reporting, mobile originated data transfer, or mobile terminated data transfer.

14. A method for wireless communication at a user equipment (UE), the method comprising:
receiving, from a network entity, a configuration for a first downlink (DL) bandwidth part (BWP), a first control resource set (CORESET) configured on the first DL BWP, and one or more first search space (SS) sets within the first CORESET;
receiving, from the network entity, a configuration for a second DL BWP, a second CORESET configured on the second DL BWP, and one or more second SS sets within the second CORESET;
receiving signaling configuring the UE for physical downlink control channel (PDCCH) monitoring adaptation;
monitoring, during discontinuous reception (DRX) cycles, for an indication of PDCCH monitoring adaptation when performing one or more idle mode or inactive mode procedures on at least one of the first DL BWP or the second DL BWP;
receiving, as a result of the monitoring, signaling activating PDCCH monitoring adaptation, on at least one of the first DL BWP or the second DL BWP, in accordance with the configuration;
updating, based on the signaling activating PDCCH monitoring adaptation, at least one of PDCCH monitoring periodicity, time offset of a PDCCH monitoring window, duration of the PDCCH monitoring window, time offset of a PDCCH monitoring skipping window, or a duration of the PDCCH monitoring skipping window; and
monitoring for PDCCHs, subject to the PDCCH monitoring adaptation, when performing one or more idle mode or inactive mode procedures on at least one of the first DL BWP or the second DL BWP.

15. The method of claim 14, wherein the signaling indicating a configuration for PDCCH monitoring adaptation is received via at least one of downlink control information (DCI), medium access control (MAC) control element (CE), radio resource control (RRC) signaling, or a combination thereof.

16. The method of claim 14, further comprising:
updating, based on the signaling, at least one of SS sets or a CORESET configuration for PDCCH monitoring on at least one of the first DL BWP or the second DL BWP.

17. A method for wireless communication at a network entity, the method comprising:
transmitting, to a user equipment (UE), a configuration for a first downlink (DL) bandwidth part (BWP), a first control resource set (CORESET) configured on the first DL BWP, and one or more first search space (SS) sets within the first CORESET;
transmitting, to the UE, a configuration for a second DL BWP, a second CORESET configured on the second DL BWP, and one or more second SS sets within the second CORESET;
transmitting signaling configuring the UE for physical downlink control channel (PDCCH) monitoring adaptation;
transmitting, during discontinuous reception (DRX) cycles, signaling indicating PDCCH monitoring adaptation when performing one or more idle mode or inactive mode procedures on at least one of the first DL BWP or the second DL BWP;
updating, based on the signaling indicating PDCCH monitoring adaptation, at least one of SS sets or a CORESET configuration for transmitting PDCCH on at least one of the first DL BWP or the second DL BWP; and
transmitting PDCCHs, subject to the PDCCH monitoring adaptation, when participating with the UE in one or more idle mode or inactive mode procedures on at least one of the first DL BWP or the second DL BWP.

18. The method of claim 17, wherein the signaling indicating PDCCH monitoring adaptation is transmitted via at least one of downlink control information (DCI), medium access control (MAC) control element (CE), radio resource control (RRC) signaling, or a combination thereof.

19. The method of claim 17, wherein the PDCCH monitoring adaptation is activated when the UE, while in idle or inactive mode, switches from the first DL BWP to the second DL BWP or switches from the second DL BWP to the first DL BWP.

* * * * *